United States Patent [19]
Ooyoshi et al.

[11] Patent Number: 5,848,058
[45] Date of Patent: Dec. 8, 1998

[54] FRAME RELAY SWITCHING NODE

[75] Inventors: Akitsugu Ooyoshi; Hiroyuki Kurisutani; Yukio Sone, all of Kawasaki, Japan

[73] Assignee: Fujitsu Limited, Kanagawa, Japan

[21] Appl. No.: 508,000

[22] Filed: Jul. 27, 1995

[30] Foreign Application Priority Data

Jul. 28, 1994 [JP] Japan ................................ 6-177334

[51] Int. Cl.⁶ ................................................ H04L 12/56
[52] U.S. Cl. .............................................. 370/244; 370/394
[58] Field of Search ................................... 370/216, 229, 370/235, 241, 242, 244, 252, 394, 389, 230

[56] References Cited

U.S. PATENT DOCUMENTS

| | | | |
|---|---|---|---|
| 5,168,497 | 12/1992 | Ozaki et al. | 370/94.1 |
| 5,444,706 | 8/1995 | Osaki | 370/94.1 |
| 5,446,733 | 8/1995 | Tsuuoka | 370/60.1 |
| 5,493,562 | 2/1996 | Lo | 370/17 |

FOREIGN PATENT DOCUMENTS

| | | | |
|---|---|---|---|
| 59-91759 | 5/1984 | Japan | H04L 11/20 |
| 63-206048 | 8/1988 | Japan | H04L 11/20 |

OTHER PUBLICATIONS

A. Platt et al., "Some Aspects of Traffic Management in Frame Relay Networks," IEE 8th Teletraffic Symposium, pp. 23/1–6 1991.

F.R. Goldstein, "Congestion Control in Frame Relay Networks Using Explicit Binary Feedback," 10th Ann. Int'l Conf. on Computers and Comm., pp. 558–564.

*Primary Examiner*—Chau Nguyen
*Assistant Examiner*—Kenneth Vanderpuye
*Attorney, Agent, or Firm*—Helfgott & Karas, PC.

[57] ABSTRACT

The present invention has as its object to provide a frame relay switching node for enabling the performance of fault traces without causing insufficiency in the trace area. To achieve this object, in the case where the discarding of a frame has been performed by the frame reception processing section or by the relay frame reception processing section, or in the case where the loss of a frame has occurred within the relay frame reception processing section, the contents of the discarded or lost frame are reported to the frame relay trace control section. The frame relay trace control section is made to set within the trace area only the contents and the discard factors of frames that have been discarded or lost.

3 Claims, 20 Drawing Sheets

F I G. 1 A
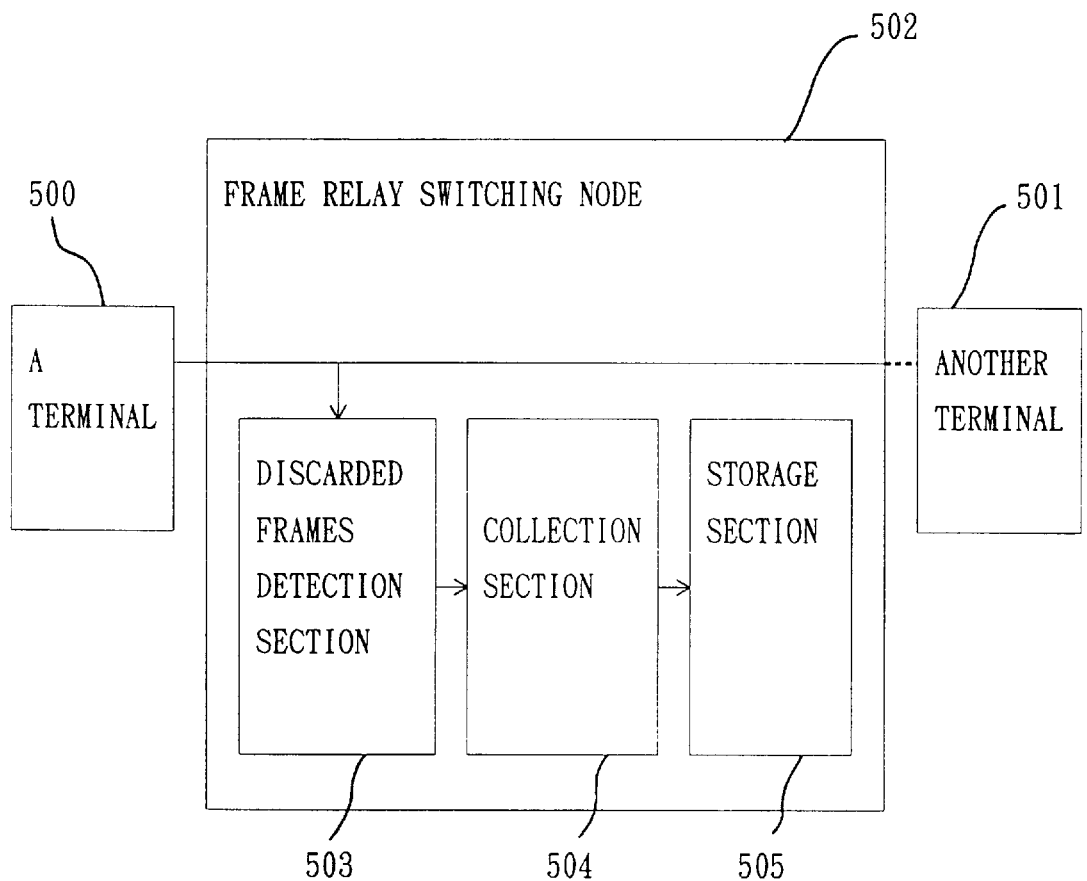
F I G. 1 B
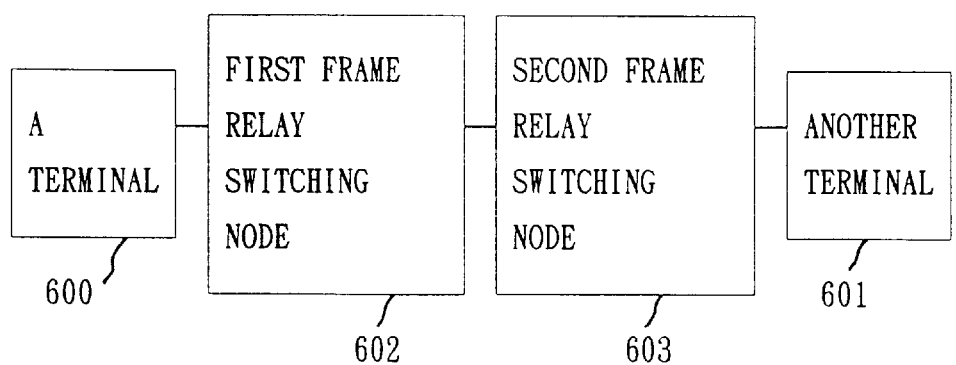

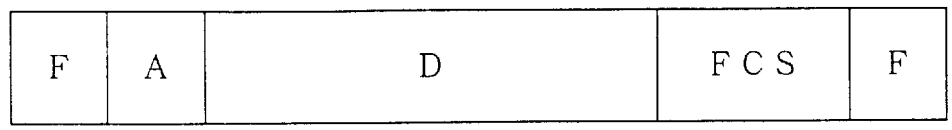
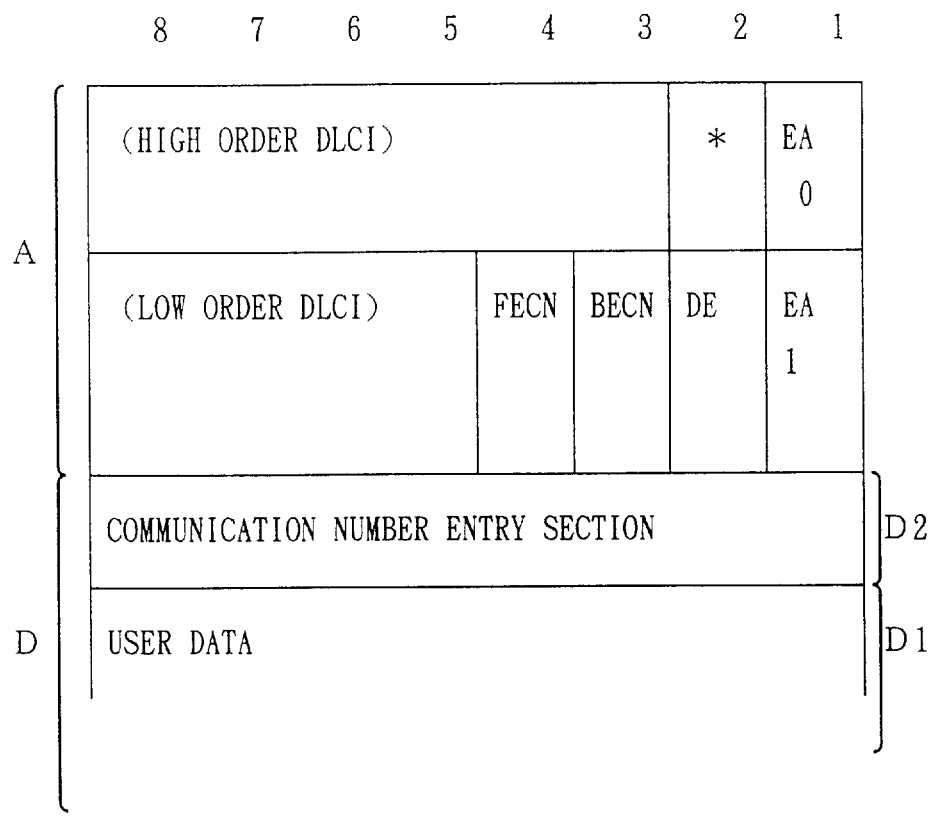

FIG. 23

TRACE AREA WITHIN NODE a
(DLC CORRESPONDENCE)

| | |
|---|---|
| COLLECTION (1) | DISCARD TIME OF FRAME 2 |
| | DISCARD CAUSE OF FRAME 2 |
| COLLECTION (2) | DISCARD TIME OF FRAME 3 |
| | DISCARD CAUSE OF FRAME 3 |

FIG. 24

TRACE AREA WITHIN NODE b
(DLC CORRESPONDENCE)

| | |
|---|---|
| DLC NUMBER | |
| DISCARD TIME | |
| COMMUNICATION NUMBER OF FRAME 2 | COLLECTION (3) |
| COMMUNICATION NUMBER OF FRAME 3 | |
| COMMUNICATION NUMBER OF FRAME 4 | |
| DISCARD TIME OF FRAME 6 | COLLECTION (4) |
| DISCARD CAUSE OF FRAME 6 | |

FRAME RELAY SWITCHING NODE

BACKGROUND OF THE INVENTION (1) Field of the Industrial Use

The present invention relates to a frame relay switching node used within a frame relay network. In other words, the present invention relates to a frame relay switching node that, in the case where faults in frames occur, can trace (record) the contents of these frame faults.

(2) Related Art

Currently, an integrated-services digital network (ISDN) is being constructed worldwide as a data communications network. Conversely, there is widespread diffusion of within-company local area networks (LANs) as communications networks closed to use within the same building or site.

Data communications systems used within these LANs or the ISDN are, for example, the packet switching system already employed from the past, and the frame relay system which has come into use recently. Within either of these communications systems, data to be sent is divided into blocks of some size; control data such as address information of the communication destination, etc., is then added to a data block, and a packet or frame (below, "communications unit") is generated. When this communications unit is sent out into the communications network, each of the switching nodes that comprise the communications network read out from the communications unit the address information, etc., of the communication destination. Then, the switching node selects an appropriate trunk line based on the address information, and transfers the communications unit toward the communication destination.

However, within these communications systems, there are also cases where, due to quality or capacity limitations, etc., of the switching nodes and the trunk lines, or because of control errors, etc., on the terminal side, faults occur: the previously mentioned communications units are discarded, or lost, or errors occur in the control data of the communications units, etc.

In regards to these faults, within the packet switching system employed from the past, since this is originally a slow-speed communications system, a fault trace method as described below has been established. Moreover, the fault trace method used within this packet switching system follows the X.25 protocol stipulated by the ITU (CCITT) Recommendation of 1980. In other words, within this X.25 protocol, each packet switching node traces (records) within the trace area of the memory provided within the node the contents of all packets (as well as, for those packets where faults have occurred, the cause of the fault occurrence and the time of fault occurrence). Then, each switching node checks the trace results recorded within the trace area and detects any protocol abnormalities. Furthermore, each switching node determines a response strategy according to the type of detected fault (as described above); for example, the node may notify the concerned terminal of an abnormality, or resend the packet, etc.

Nevertheless, the fault trace method using the X.25 protocol used within this packet switching system cannot be employed as is within the frame relay system. This is because this frame relay system is, compared with packet switching, originally a considerably faster data communications method; therefore, there is also a considerably large number of frames flowing into a switching node within a unit of time. In brief, if each switching node were to trace all of the information (frame contents, the causes of fault occurrences, fault occurrence times) of all of the inflowing frames, the capacity of the trace area would soon become full, and an insufficiency would occur within this limited trace area. Moreover, if this type of trace-area insufficiency were to occur, a contradiction would occur in that a determination would be made that congestion had occurred within the communications network, and the insufficiency would be treated as such. Thus, within previous frame relay systems, fault traces could not be performed.

Moreover, even with the frame relay system, congestion detection has been performed as a means of confirming the normalcy of frames. This "congestion" is a state whereby, because the data amount flowing within the transmission network has exceeded a permissible value, throughput within the transmission network is in decline. However, the response strategy for this congestion detection has been merely a notification of discarded frames, as well as an FECN (forward explicit congestion notification) and a BECN (backward explicit congestion notification). In other words, with the frame relay method, since fault traces could not be performed for the reasons described above, multiple types of fault occurrences could not be determined separately, and separate response strategies conforming to each fault type could not be determined. For the same reasons, frames in which faults had occurred such as discarding, etc., could not be specified.

The primary theme of the present invention is, in order to solve the above problems, to provide a frame relay switching node that can perform fault traces without causing an insufficiency in the trace area.

Also, as described above, with the congestion detection method of previous frame relay systems, it has been impossible to specify the frames in which faults have occurred. Therefore, it has been completely impossible to recognize on the communications network side which specific frames have been lost between nodes.

The second theme of the present invention is to solve this problem by providing a fault trace system that can recognize on the communications network side the specific frames that have been lost between nodes.

Furthermore, with the congestion detection of previous frame relay systems, fault detection could not be performed for each specific terminal or for each specific communication (a data link between specific terminals).

The third theme of the present invention is to solve this problem by providing a trace system that can perform fault detection for each specific terminal or for each specific communication (a data link between specific terminals).

SUMMARY OF THE INVENTION

The first frame relay switching node of the present invention, when discarded frames have been detected within the frame relay network with the discarded frames detection means, collects only frame information concerning discarded frames with the collection means. Then, the collection means notifies the storage means of collected information.

The storage means stores the notified information.

In this way, the amount of information concerning frames to be collected can be limited.

Here, the collection means, when the discarded frames detection means has detected discarded frames within the frame relay network, can be made to collect information only concerning discarded frames that excludes frame contents; in other words, only the cause of the discard. In this way, the amount of information concerning frames to be collected can be further limited, thereby enabling the performance of fault traces without generating an insufficiency in the capacity of the memory area.

The second frame relay switching node of the present invention, in the case where the frame reception section has received frames, and the discarded frames detection means has detected frames that have been discarded within the frame relay network, collects with its collection means only a portion of the information concerning frames, including the contents of frames received by the frame reception section and the discard cause for discarded frames detected with the discarded frames detection means. In this way, the amount of information to be collected can be limited and, at the same time, in the case where there is no need to limit information amounts, other frame information may be collected as well.

Here, a designation means may be provided for performing designations to the collection means for performing a designation for collecting the contents of all frames received by the frame reception section, or for designating, from all of the frames received at the frame reception section, the collection of only the contents concerning discarded frames detected with the discarded frames detection means, or for designating the collection of only the discard cause for discarded frames detected with the discarded frames detection means.

Furthermore, when the frame reception section has received frames, and the discarded frames detection means detects discarded frames within the frame relay network, the designation means references the use rate of a processor, and determines whether to make the collection means either collect the contents of all frames received by the frame reception section, or to collect from all of the frames received by the frame reception section only discarded frames detected with the discarded frames detection means, or to collect only the discard cause for discarded frames detected with the discarded frames detection means. Then, the collection means, according to the designation determined by the designation means, collects a portion of the information concerning frames, including the contents of frames received by the frame reception section and the discard cause for discarded frames detected with the discarded frames detection means.

Therefore, the extent of frames to be collected and the amount of information to be collected can be designated automatically.

Here, the designation means references the use rate of a processor, and if it is less than the relatively low first level, the designation means performs a designation to the collection means to collect the contents of all of the frames received by the frame reception section. Also, the designation means, in the case where the use rate of a processor is above the first level but less than the relatively high second level, performs a designation to the collection means to collect from all of the frames received at the frame reception section only discarded frames detected with the discarded frames detection means. Furthermore, the detection means, in the case where the use rate of a processor is above the second level, instructs the collection means to collect only the discard causes for discarded frames detected with the discarded frames detection means.

The first trace system of the present invention detects frames that have been discarded within the frame relay network, and collects the information concerning frames for only these discarded frames. In this way, information that must be collected concerning frames can be limited to information concerning only discarded frames, thereby enabling a reduction in the information amount that must be stored.

With the second trace system of the present invention, the first frame relay switching node that has received frames sent successively from a certain terminal affixes consecutive numbers to each of these frames according to the order they were received. Then, the first frame relay switching node transfers received frames to the second frame relay switching node according to the address information. The second frame relay switching node receives the frames transferred from the first frame relay switching node, and checks whether or not each frame has been received in the order of the consecutive number. As a result of the check, in the case where the frames have not been received in the order of the consecutive number, the second frame relay switching node judges that a frame fault has occurred.

In this way, in the case where a number is missing, or if numbers have been transposed, it can judge whether a frame has been lost between nodes, or if there is some kind of a fault with the trunk line, etc. Therefore, the loss of specific frames between nodes can be recognized on the communications network side.

Here, within the second trace system, the first frame relay switching node, through the designation of one of the terminals performing communications, can specify the other terminal. Through this specification, the first frame relay switching node can affix consecutive numbers to only those frames being sent and received between terminals that are in a state of communication. Therefore, it can perform fault detection for each communication, and can perform fault detection for each specific terminal or for each specific communication (a data link between specific terminals).

BRIEF DESCRIPTION OF THE DRAWINGS

FIG. 1A and FIG. 1B are block diagrams showing the internal configuration of the frame relay switching node of a preferred embodiment of the present invention.

FIG. 4 is a configuration diagram of the frames according to the CCITT Recommendation.

FIG. 5 is a configuration diagram of the address field and the user data field found within FIG. 4.

FIG. 23 is a diagram of the trace area within the sending node as a result of the procedure of FIG. 22.

FIG. 24 is a diagram of the trace area within the destination node as a result of the procedure of FIG. 23.

DETAILED DESCRIPTION OF THE PREFERRED EMBODIMENTS

EMBODIMENT 1

Figure 2:
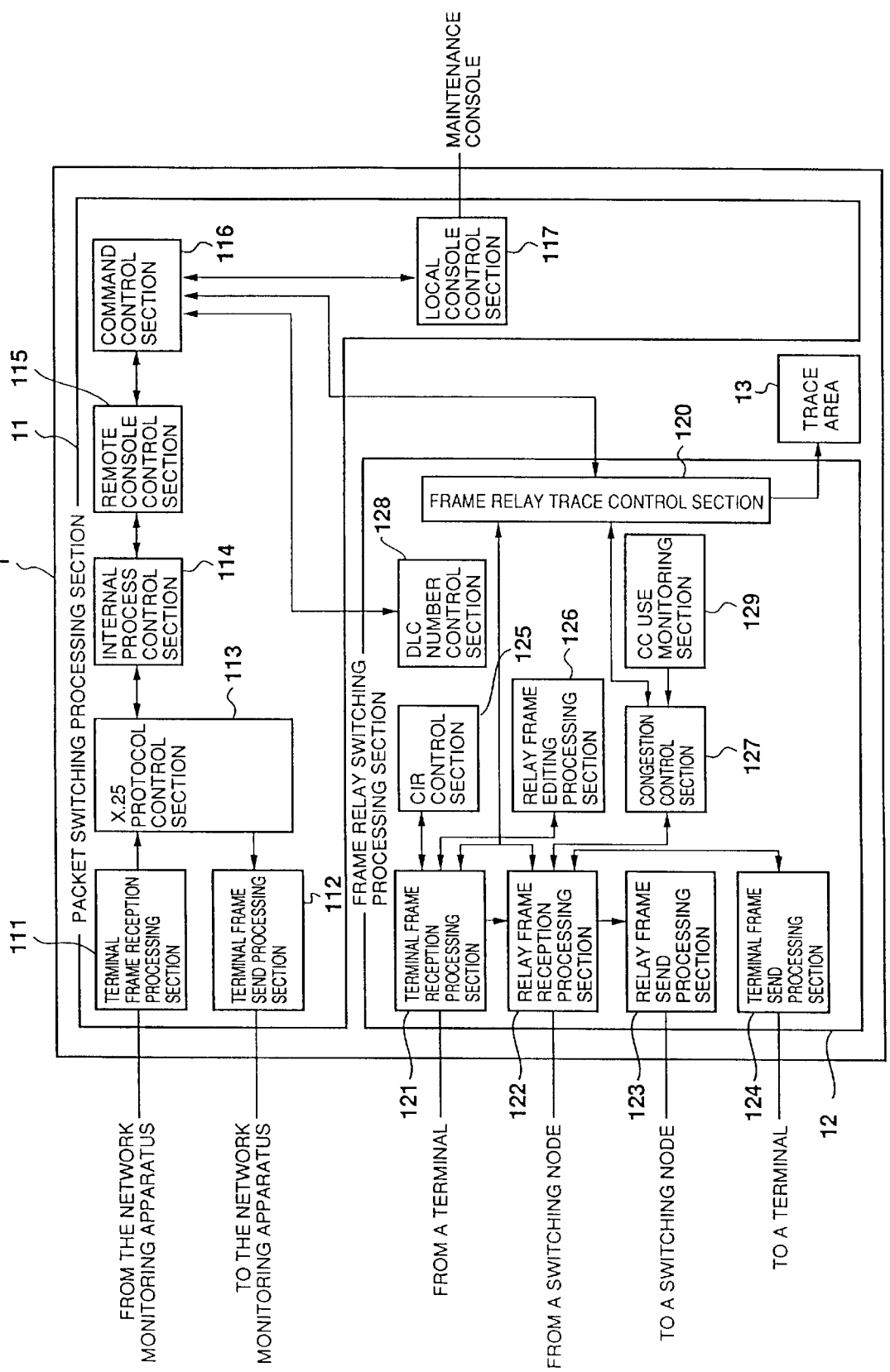
FIG. 2 is a block diagram showing the internal configuration of the frame relay switching node of a preferred embodiment of the present invention.

The first embodiment of the present invention will be explained according to the diagrams.
Configuration of the preferred embodiment FIGS. 1A and 1B are diagrams that show the outline of the frame relay network of the first preferred embodiment of the present invention.

As shown in FIG. 1A, the frame relay network is equipped with the frame relay switching node 502 that comprises the frame relay network for sending frames sent from the single terminal 500 towards another terminal 501.

Then, the frame relay switching node 502 is equipped with a discarded frames detection section 503 for detecting frames discarded within the frame relay network, a collection section 504 for performing collection of information concerning only those frames detected with this discarded frames detection section 503, and a storage section 505 for storing information concerning the frames collected with this collection section 504.

Below, each configuration element will be described.
Frame relay network

The frame relay network is the ISDN or a LAN.
Frame relay switching nodes

There is no limitation to the numbers of frame relay switching nodes 502 that comprise the frame relay network; even supposing that there were only a single frame relay switching node 502, it would still be possible to apply the present invention.
Terminals Terminals 500 and 501 that are connected to the frame relay switching node 502 may be personal computers, facsimile machines, or digital telephones. In sum, as long as these terminals are digital and can send or receive information, they are applicable.
Discarded frames detection section The "discarding" of frames detected with the discarded frames detection section 503 includes those cases where frames have been actively discarded, as well as those cases where frames have been lost. The "discarding" of these frames may occur within the node 502, or it may occur on the trunk line for connections with the node 502. An example of a "discarding" that occurs within the node 502 is the case where, for example, a state of congestion has occurred within the node 502, etc. An example of a case where "discarding" occurs on the trunk line is, for example, a disconnection of the trunk line, etc.
Collection section Information concerning frames collected with the collection section 504 includes frame contents, the causes of frame discarding, and the time of frame discarding. However, this information does not have to include the frame contents. If such information is not included, the amount of information collected with the collection section 504 may be reduced, and the worsening of a state of congestion may be prevented.

Moreover, the information concerning frames collected with the collection section 504 may be expanded to include information concerning frames other than discarded frames, or may be configured such that only a portion of the information concerning these frames is collected with the collection section 504. If this is done, the information to be collected can be selected on a case-by-case basis.

For example, a designation section may be provided in addition to the above-noted configuration, and this designation section may be used to designate for the collection section what portion of the information concerning frames is to be collected. Specifically, the designation section may selectively perform a designation for collecting the contents of all frames received by the frame reception section, or a designation for collecting from all of the frames received at the frame reception section only the contents of discarded frames detected with the discarded frames detection means 503, or a designation for collecting only the discard causes for discarded frames detected with the discarded frames detection section 503. If this is done, how detailed the information is to be, as well as the total amount of information, can be regulated on a case-by-case basis for an appropriate balance. The designation section can reference the use rate of a processor for performing control of the node 502, and then perform a designation selection. For example, in the case where the use rate of a processor is less than the relatively low first level, it performs a designation for collecting the contents of all of the frames received by the frame reception section. Also, the designation section, in the case where the use rate of a processor is above the first level but less than the relatively high second level, performs a designation for collecting from all of the frames received at the frame reception section only discarded frames detected with the discarded frames detection section 503. Furthermore, the detection section, in the case where the use rate of a processor is above the second level, instructs for the collection of only the discard causes for discarded frames detected with the discarded frames detection section 503.

If this is done, how detailed the information is to be, as well as the total amount of information, can be automatically regulated to obtain the optimum balance.

Storage section

The storage section 505 may be a memory provided within the node or a large-capacity disk apparatus, for example, a hard disk, etc.

The operation of the preferred embodiment

Below, the operation of the present preferred embodiment will be explained.

When the discarded frames detection section 503 detects frames that have been discarded within the frame relay network, the collection section 504 collects information only concerning discarded frames. Then, the collection section 504 notifies the storage section 505 of the collected information.

The storage section 505 stores the information notified to it from the collection section 504.

Here, in the case where a designation section is provided, when the discarded frames detection section 503 detects discarded frames, the designation section references the use rate of a processor, and determines whether the use rate of a processor is less than the first level, or whether it is above the first level and below the second level, or whether it is above the second level. Here, in the case where the use rate of a processor is less than the first level, it performs a designation to the collection section 504 for collecting the contents of all of the frames received by the frame reception section. Also in the case where the use rate of a processor is above the first level but less than the second level, the designation section performs a designation to the collection section 504 for collecting from all of the frames received at the frame reception section only discarded frames detected with the discarded frames detection section 503. Furthermore, in the case where the use rate of a processor is above the second level, the detection section performs a designation to the collection section 504 for collecting only the discard causes for discarded frames detected with the discarded frames detection section 503.

The collection section 504 collects information according to the designation of the designation section, and notifies the storage section 505.

In this way, fault traces can be performed without resulting in an insufficiency in the trace area.

Embodiment 2

Preferred embodiment 2 will be explained according to FIG. 1B.

The frame relay network of the present preferred embodiment is comprised of two frame relay switching nodes 602 and 603 for sending frames sent from the single terminal 600 toward another terminal 601.

Then, each frame relay switching node 602 and 603, when it receives, respectively, frames sent successively from terminals 600 and 601, attaches successive numbers to these frames in the order that they were received.

Here, in the case where frames are sent from the single terminal 600 to another terminal 601, the first frame relay switching node 602 attaches consecutive numbers to the frames received from the single terminal 600, and transfers these to the second frame relay switching node 603.

The second frame relay switching node 603 detects the numbers of the frames received from the first frame relay switching node 602, and checks to see whether the frames have been received in the order of the consecutive number. Here, if the frames have not been received in the order of the consecutive number, the second frame relay switching node 603 judges that a frame fault has occurred.

Furthermore, the first frame relay switching node 602 and the second frame relay switching node 603, when performing numerical monitoring, by designating the single terminal 600 or the other terminal 601, can perform fault monitoring for each and every communication.

Embodiment 3

The third embodiment of the present invention will be explained by referring to the diagrams.

Configuration of the preferred embodiment Frame relay network

Figure 3:
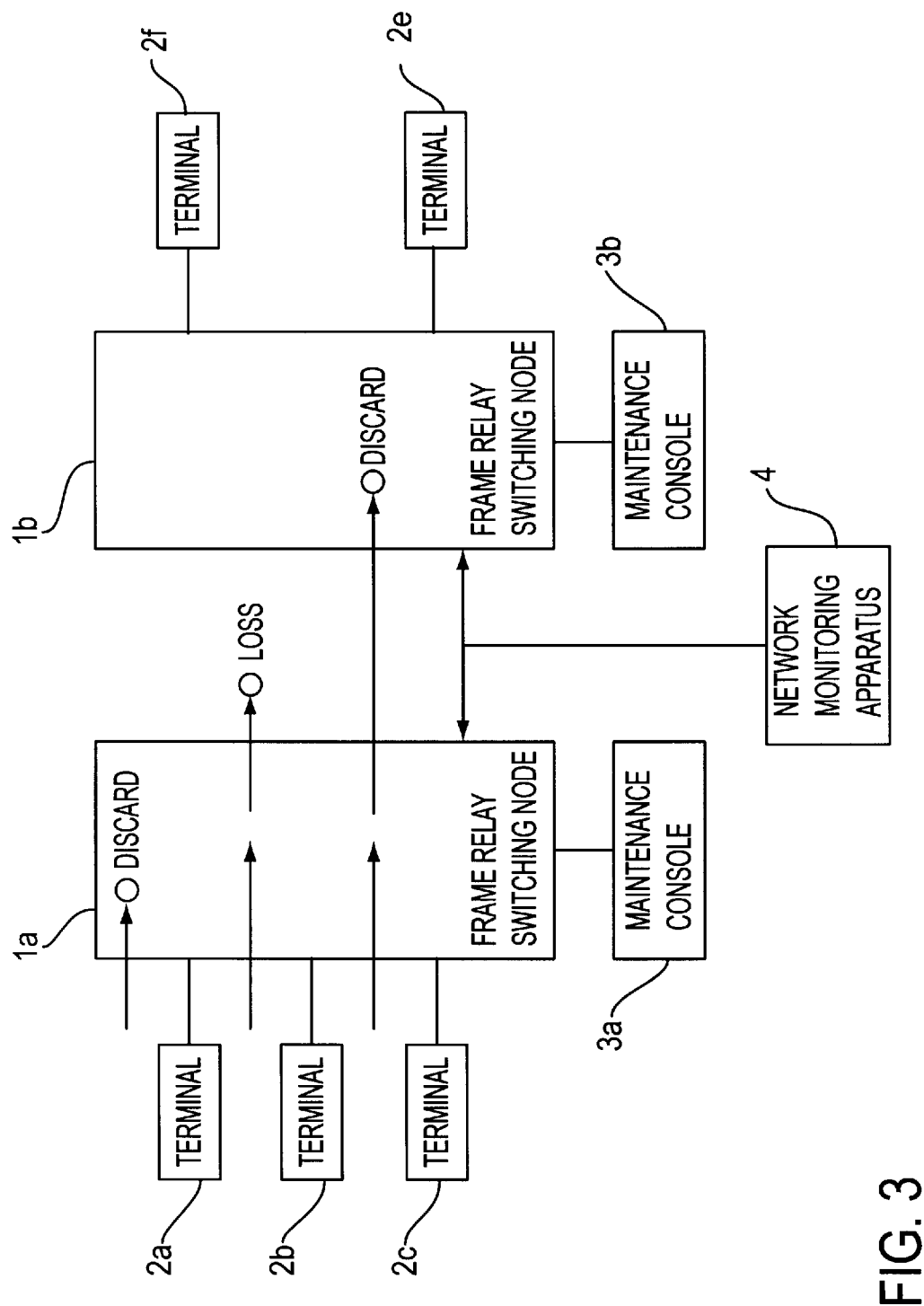
FIG. 3 is a diagram showing an outline of the frame relay network of a preferred embodiment of the present invention.

FIG. 3 is a diagram that shows an outline of the frame relay network within the third preferred embodiment of the present invention. This "frame relay" was developed within the already existing packet communications; it corresponds to Step 3 of the development steps for packet communications as shown by the CCITT (International Telegraph and Telephone Consultative Committee). As for its contents, the following may be stated: with the goal of unifying the call-control procedure for packet communications with that for circuit switching, not only call coupling and uncoupling, but also added services, would be provided in a common form without relying on a bearer service; at the same time, with the goal of protocol simplification on the user side, within the network, only routing and the discarding of error-containing frames would be performed by the conversion of the logic channel within the second layer. With this frame relay system, since, compared with the past, the network's processing load could be lightened, high-speed throughput and short delays could be realized.

FIG. 3, as a portion of the frame relay network, shows an example of two frame relay switching nodes 1*a* and 1*b* mutually connected with trunk line φ. Moreover, to simplify the explanation, node 1*a* will be considered the sending node, and node 1*b*, the destination node. Also, terminals 2*a*–*c* are connected to the frame relay switching node 1*a*, and terminals 2*d*–*e* are connected to the frame switching node 1*b*. Moreover, the connections between each of the terminals 2 will be considered to be performed with a PVC (Permanent Virtual Circuit). Also, each of the terminals 2 includes a DTE (data terminal entity).

The arrows within FIG. 3 represent the flow of frames. Also, the black circles within FIG. 3 only show places where faults may occur in the form of frame discarding or loss; they do not mean that these faults always occur.

The switching nodes 1*a* and 1*b* have connected to them, respectively, maintenance consoles 3*a* and 3*b*. These maintenance consoles 3*a* and 3*b*, by issuing commands for maintenance to each switching node 1*a* and 1*b*, have the function of monitoring and controlling the status of each switching node 1*a* and 1*b*.

Also, a common network monitoring apparatus 4 is connected to each switching node 1*a* and 1*b*. This network monitoring apparatus 4 has the function of monitoring the status of the entire frame relay network, including the trunk line φ, and of issuing commands for maintenance monitoring to each switching node 1*a* and 1*b*.

Frame architecture

Moreover, the frame relay network shown in FIG. 3 performs interfacing between each of the terminals 2, as well as interfacing between each of the frame relay switching nodes 1, according to the CCITT Recommendation Q.922 and CCITT Recommendation Q.933.

FIG. 4 shows the configuration of frames that will undergo switching processing according to these Advisories by each node 1a and 1b; they are comprised, from the frame header, of the flag field F, the address field A, the user data field D, the frame check sequence field FCS, and the flag field F.

Of these identifiers, the flag fields F show the demarcation of the beginning and the end of the frame. Also, the frame check sequence field FCS is a field for detecting whether or not a transmission has occurred within the octet string from the address field A to the FCS.

The address field A, as shown in FIG. 5, is comprised of two octet fields, and contains the following information: the high order data link connection identifier DLCI, the command/response bit *, the address field expander bit EA, the low order data link connection identifier DLCI, the forward explicit congestion notification bit FECN, the backward explicit congestion notification bit BECN, and the discardable bit DE. Here, the data link connection identifier DLCI (below, "the DLC number") is information for specifying the PVC to be established between the terminals. The discardable bit DE (below, "the DE bit") is a bit that shows, in the case where congestion occurs within a switching machine within the network, the fact that it may be discarded with top priority; the explicit congestion notification bits FECN and BECN are bits for notifying either the reception side or the sending side that a congestion has actually occurred. Moreover, here, "congestion" is determined upon when the use rate of a processor or the buffer use rate of node 1 exceeds a fixed level.

Within the user data field D is stored the contents of actual communications sent and received between terminals. Moreover, with the present preferred embodiment, when each frame is transferred within the frame relay network, within this user data field D, in addition to the user data $D_1$ which is the content of the original communication sent from a terminal, a communication number entry section $D_2$ one octet long is added. This communication number entry section $D_2$ is removed when each of the frames has been finally sent from the frame relay network to the communication destination terminal.

The frame relay switching node

Next, the specific configuration of each frame relay switching node 1 will be explained based on the block diagram, FIG. 2. These frame relay switching nodes 1 exist to realize a frame relay switching service.

As shown in FIG. 2, each frame relay switching node 1 is comprised of the following large divisions: the packet switching processing section 11, the frame relay switching processing section 12, and the trace area 13. The trace area 13, which serves as the storage section, is the domain for storing trace information secured within the memory of the switching nodes 1, which is not shown in the diagram.

The frame relay switching processing section 12 is a portion for performing, according to CCITT Recommendation Q.922 and CCITT Recommendation Q.933, frame sending and reception processing from the users (terminals 2) to the frame relay switching nodes 1, as well as frame sending and reception processing between the nodes of the frame relay switching node 1. Conversely, the packet switching processing section 11 is a portion for accommodating with the X.25 protocol, through the previously existing packet switching machine function, the network monitoring apparatus 3 to the previously stated frame relay switching nodes 1. The packet switching processing section 11 possesses various essential functions for guaranteeing the uniform management of fault traces with the accommodated network monitoring apparatus 3.

Next, the correlative relationship between each of the processing blocks that configure each switching processing section 11 and 12 will be explained. These processing blocks, by executing with a processor (CC) the programs stored within the main memory (MM) of the switching nodes, which is not shown in the diagram, realize their function. Moreover, in the case where frame discarding has occurred in whichever of the processing blocks, the functions of the other processing blocks are terminated (in other words, processing is not performed with the other processing blocks), and the frame relay trace control section 120 is immediately started up.

The frame switching processing section 12 is comprised of the terminal frame reception processing section 121, which is connected to terminals 2; the relay frame reception procession section 122, which is connected to the other switching node 1 and the terminal frame reception processing section 121; the relay frame send processing section 123, which is connected to the other switching node 1 and the relay frame reception processing section 122; the terminal frame sending processing section 124, which is connected to terminals 2 and the relay frame reception processing section 122; the CIR control section 125 and the relay frame editing processing section 126, each of which is connected to the terminal frame reception processing section 121; the congestion control section 127, which is connected to the relay frame reception processing section 122: the CC use rate monitoring section 129, which is connected to this congestion control section 127; the frame relay trace control section 120, which is connected to the terminal frame reception processing section 121, the relay frame reception processing section 122, the congestion control section 127, and the trace area 13; and the DLC number control section 128.

Conversely, the packet switching processing section is comprised of the terminal frame reception processing section 111 and the terminal frame send processing section 112, each of which is connected to the network monitoring apparatus 4; the X.25 protocol control section 113, which is connected to the terminal frame reception processing section 111 and the terminal frame send processing section 112; the internal process control section 114, which is connected to this X.25protocol control section 113; the remote console control section 115, which is connected to this internal process control section 114; the command control section 116, which is connected to the remote console control section 115, the DLC number control section 128, and the frame relay trace control section 120; and the local console control section 117, which is connected to the command control section 115 and the maintenance console 3.

Below, the function of each function block will be explained.

Terminal frame reception processing section 121

The terminal frame reception processing section 121, which is the frame reception section and the discarded frames detection section, possesses the function of receiving frames from the terminals 2. Usually, this terminal frame reception processing section 121 is connected to multiple terminals 2. However, with the DLC numbers of received frames, it can identify from which terminal of these terminals 2 the frames are from.

Also, the terminal frame reception processing section 121, when it receives a frame, checks the normalcy of the frame. In other words, at the times when a frame checker sequence (FCS) error occurs, or when the length of received data is too long, or when a DLC number error (in the case where a DLC number, etc., corresponds to a previously reserved DLC number) or another error occurs, it judges that an abnormality has occurred. The terminal frame reception processing section 121, at the time of this kind of an abnormality, discards the frame. Then, in the case where a frame discard has been performed, it starts up the frame relay trace control section 120 with this discarded frame and the cause of the discard as input information.

The terminal frame reception processing section 121, in the case where a frame abnormality is not occurring, starts up the CIR control section 125, and causes it to perform a check on the data amount flowing in from the terminal 2 that is the original sender of the relevant frame. Then, at the time when it receives from the CIR control section 125 the results of the inflowing data amount check as return information, it starts up the relay frame editing processing section 126 with this return information and the received frame as input information, and causes it to perform a format conversion to obtain a frame format for relaying the frame between the nodes of node 1. Upon completion of this format conversion, it notifies the relay frame reception processing section 122 of the completely edited received frame.

CTR control section 125

The CIR control section 125, in the case where its node 1 has received a frame from a terminal 2, is started up by the terminal frame reception processing section 121. Then, it possesses the function of monitoring data amounts from this terminal 2.

The CIR control section 125, in the case where the data amount from the terminal 2 exceeds a prescribed CIR (the information transfer speed that can be guaranteed by the network when the frame relay network is in a normal state, a rate determined at the time of contract between the network and the user), notifies the terminal frame reception processing section 121 with this fact as return information.

Relay frame editing processing section 126

The relay frame editing processing section 126 is started up by the terminal frame reception processing section 121. Then, it inserts into the header of the user data field D of the frame that has been passed on to it from the terminal frame reception processing section 121 a communication number entry section $D_2$, and writes into this communication number entry section $D_2$ a consecutive serial number (communication number) that is determined cyclically. These communication numbers are affixed one by one to each frame of a group of frames that have the same DLC number, in the order the frames are received. Therefore, if frames have the same DLC numbers, by viewing the communication number of each frame, the order of the frames can be recognized. Moreover, this communication number entry section $D_2$ may also be added to the last line of the user data field D.

Also, the relay frame editing processing section 126, in the case where the fact that the data amount from the terminal 2 exceeds the CIR is written into the return information received from the terminal frame reception processing section 121, sets the congestion information (the DE bit) within the address field A of the received frame to DE=1.

The relay frame editing processing section 126, after performing the above-described editing, sends back the completely edited frame to the terminal frame reception processing section 121.

Relay frame reception processing section 122

The relay frame processing section 122, which is the frame reception section and the discarded frames detection section, is started up by receiving a frame from another node 1 (usually, multiple nodes are connected to it) or from the terminal frame reception processing section 121.

The relay frame processing section 122, in the case where it is started up by the reception of a frame from another node, checks the communication number entered in the communication number entry section $D_2$ of the received frame. In other words, it checks among mutual frames that have the same DLC number whether there is a missing communication number, or whether there has been a transposition of order (that is, when a frame with a "slow" number is received before a frame with a "fast" number). Then, in the case where a missing communication number or a transposition of order has been detected, it discards that frame. At this time, the relay frame processing section 122 starts up the frame relay trace control section 120 with the discarded frame contents and the discard cause (a missing number, an order transposition) as input information. Moreover, the relay frame processing section 122, in the case where it is started up by the terminal frame reception processing section 121, does not perform the communication number check described above.

No matter which apparatus starts it up, the relay frame processing section 122, after it is started up, makes an inquiry about the congestion status to the congestion control section 127. Then, based on the return information (the result of the congestion status inquiry), it judges whether or not a state of congestion exists, and the extent of any congestion. If the result of the judgment is that a mild state of congestion exists (a state in which the load from the terminal to the network is nearing the permissible limits of the network, and where the throughput rise rate of the network will decline), it discards the received frame only in the case where the DE bit of the received frame is "1"; if the result is that a severe state of congestion exists (a state in which the load from the terminal to the network is further increasing, and where the throughput of the network itself will decline), it discards the received frame without exception. In the case where it has performed a discard of the received frame, the relay frame processing section 122 starts up the frame relay trace control section 120 with the contents of the discarded frame and the discard cause (network congestion) as input information.

No matter whether a state of congestion exists or not, following this, the relay frame processing section 122 performs a notification of the received frame. In other words, in the case where the received frame is addressed to the section's own node (a subordinate terminal 2), it starts up the terminal frame send processing section 124, and performs a notification of the received frame; in the case where the received frame is addressed to the other node (a subordinate terminal 2), it starts up the relay frame send processing section 123, and performs a notification of the received frame.

CC use rate monitoring section 129.

The CC use rate monitoring section 129 constantly monitors the use rate of the CC (a processor not shown in the diagram) located within its own node 1. If the use rate of CC has changed to where it has risen above a prescribed stipulated rate that shows a state of congestion, or in the case where it has changed to where it has fallen below a prescribed stipulated rate that shows an elimination of congestion, it notifies the congestion control section 127 of this fact. Moreover, the frame relay trace control section 120 is also notified of this use rate of CC via the congestion control section 127.

Congestion control section 127

The congestion control section 127 constantly monitors the number of used buffers for performing frame relay switching processing; it manages to see whether this buffer use number changes to where it has risen above a prescribed stipulated rate that shows a state of congestion, or whether it has changed to where it has fallen below a prescribed stipulated rate that shows an elimination of congestion. The congestion control section 127 also manages the status of the use rate of CC notified to it from the CC use rate monitoring section 129.

Then, in the case where it has received an inquiry from the relay frame reception processing section 122, the congestion control section 127 notifies the relay frame reception processing section 122 of the current number of buffers in use and the use rate of CC status as return information.

Relay frame send processing section 123

Usually, multiple nodes 1 are connected to the relay frame send processing section 123. Furthermore, the relay frame send processing section 123, based on the DLC number of the received frame notified to it from the relay frame reception processing section 122, selects an appropriate node 1 for relay, and sends the received frame to it.

Terminal frame send processing section 124

Usually, multiple terminals 2 are connected to the terminal frame send processing section 124. Furthermore, the terminal frame send processing section 124 removes the communication number entry section $D_2$ from the user data field D of the received frame notified to it from the relay frame reception processing section 122. After that, the terminal frame send processing section 124, based on the DLC number of this received frame, selects an appropriate terminal 2 for sending, and sends this received frame to it.

Frame relay trace control section 120

The frame relay trace control section 120, which is the collection section for performing collection of information concerning frames, usually, at the moment it is started up by the terminal frame reception processing section 121 or by the relay frame reception processing section 122, or at the moment it is started up by the command control section 116, initiates collection activities of trace information as information regarding frames. In other words, it stores within the trace area 13 within the memory either the contents and fault information (discard causes and discard times) from all frames received within the terminal frame reception processing section 121 or within the relay frame reception processing section 122, or the contents and fault information (discard causes and discard times) of discarded frames, or the fault information (discard causes and discard times) of discarded frames, or the communication numbers of discarded frames.

DLC number control section 128

The DLC number control section 128, when it records data between terminals 2 for PVC settings, is started up by the command control section 116. Then, it memorizes the DLC numbers used for PVC settings between each of the terminals for each terminal 2 and for each PVC, and manages these DLC numbers. Moreover, even when the DLC numbers concern the same PVC, for every terminal performing communications, a different DLC number is used. The DLC number control section 128 manages all of the DLC numbers used by all of the terminals 2 that are subordinate to its own node 1; at the same time, it also manages the DLC numbers used by other communication partners of these terminals 2 when these partners are communicating with these terminals 2.

The DLC number control section 128 is also started up in the case where a DLC number inquiry has been made to it by the command control section 116. Then, when a DLC number inquiry has been made about a specific terminal 2, for all of the PVCs relating to the specified terminal 2, it notifies the command control section 116 of the DLC numbers used by this terminal 2 and by its communication partner terminal 2. Conversely, when an inquiry has been made about a specific DLC number, it notifies the command control section 116 of the DLC number of the communication partner terminal 2 that corresponds to the specified DLC number.

Terminal frame reception processing section 111

The terminal frame reception processing section 111 has the function of receiving frames (frames that are contents of a DLC number inquiry; frames that store trace initiation commands) from the network monitoring apparatus 4, extracting the X.25 protocol data section from the received frames, and using this as input information for notifying the X.25protocol control section 113.

X.25 protocol control section 113

The X.25 protocol control section 113 reads out the destination address from the X.25 protocol data it received from the terminal frame reception processing section 111. Then, based on this destination address, it sends an access request event to the internal process control section 114, establishes a link with the internal process, and notifies it of command-related data.

Also, the X.25 protocol control section 113 gives an X.25 protocol header to the return information from the internal process control section 114, and starts up the terminal frame reception processing section 112.

Internal process control section 114

The internal process control section 114 is started up by the X.25 protocol control section 113, and from the command-related data of the input information, it starts up the remote console control section 115.

Also, the internal process control section 114 notifies the X.25 protocol control section 113 of the return information from the remote console control section 115 as an access response event.

Remote console control section 115

The remote console control section 115 extracts the command data from the command-related data that is the input information from the internal process control section 114, and starts up the command control section 116.

Also, the remote console control section 115 gives remote console output control information to the return information from the command control section 116, and notifies the internal process control section 114.

Command control section 116

The command control section 116 is started up by the remote console control section 115 or by the local console control section 117, and performs command control of the frame relay trace control section 120 or of the DLC number control section 128.

In other words, the command control section 116, when the command from the network monitoring apparatus 4 is a DLC information inquiry command, starts up the DLC number control section 128 with the designated DLC number (or the designated terminal) included within the input information from the remote console control section 115.

Also, the command control section 116, when the command from the network monitoring apparatus 4 is a fault trace initiation command, starts up the frame relay trace control section 120 according to the designated DLC number included in the input information from the remote console control section 115, and to the trace parameter (to trace all the contents of all of the frames, or to trace all of the contents of only frames where faults have occurred, or to trace only the discard causes and discard times of frames where faults have occurred) that has been designated with a command from the maintenance console 3.

Also, the command control section 116, when the command from the maintenance console 3 is a fault trace initiation command, starts up the frame relay trace control section 120 according to the designated circuit number included in the input information from the local console control section 117, and to the trace parameter (to trace all the contents of all of the frames, or to trace all of the contents of only frames where faults have occurred, or to trace only the discard causes and discard times of frames where faults have occurred) that has been designated by the maintenance console 3.

Also, the command control section 116, in the case where a command has been issued for designating the size of the trace data when tracing the contents of frames, notifies the frame relay control section 120 of this command.

Terminal frame send processing section 112

The terminal frame send processing section 112, when it has received return information from the X.25 protocol control section 113, sends the frame to the network monitoring apparatus 4.

Network monitoring apparatus

Figure 6:
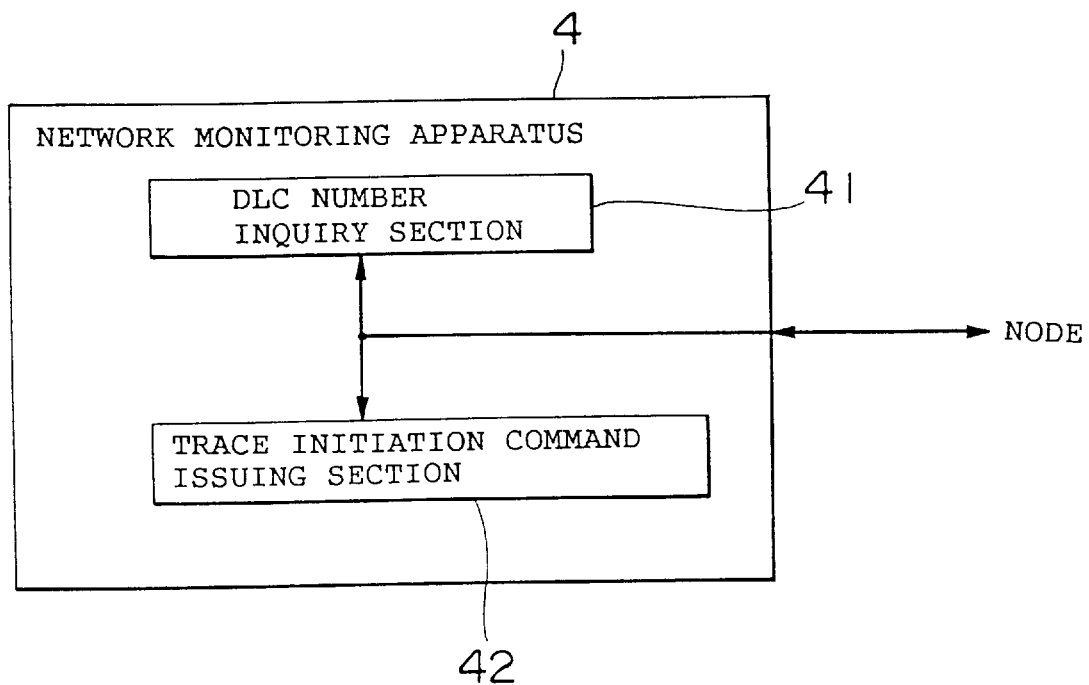
FIG. 6 is a block diagram showing the internal configuration of the network monitoring apparatus found within FIG. 3.

Next, the configuration of the network monitoring apparatus 4 will be explained. FIG. 6 is a block diagram that shows the internal configuration of this network monitoring apparatus 4.

In FIG. 6, the network monitoring apparatus 4 possesses the DLC number inquiry section 41 that is connected to the node 1, and the trace initiation command issuing section 42.

The DLC number inquiry section 41 issues a command for requesting a DLC number inquiry to the packet switching processing section 11 of node 1. Written into this command is information for specifying a terminal 2 that is connected to this node 1, or information for specifying a DLC number concerning a terminal 2 that is connected to this node 1.

The trace initiation command issuing section 42 issues a fault trace initiation command to the packet switching processing section 11 of node 1 for initiating the collection of trace information by the frame relay trace control section 120.

Maintenance console

The maintenance console 3 issues a fault trace initiation command to the packet switching processing section 11 of node 1 for initiating the collection of trace information by the frame relay trace control section 120. Moreover, this fault trace command is issued along with a designation of the circuit number of the terminal 2 that is connected to the node 1.

The maintenance console 3, which is the designation section, also issues a command-a command which is added to the fault trace initiation command that it (the maintenance console 3) is to issue or to the fault trace initiation command that is to be issued by the network monitoring apparatus 4-for designating the parameter (to trace all the contents of all of the frames, or to trace all of the contents of only frames where faults have occurred, or to trace only the discard causes and discard times of frames where faults have occurred) for performing the collection of trace information by the frame relay trace control section 120.

The maintenance console 3 also issues a command for designating the size of the trace data when frame contents are to be traced.

The operation of the preferred embodiment

Next, the procedures for performing actual fault traces within the present preferred embodiment that is configured in the manner described above will be explained.

Within the above-described configuration, the frame relay trace control section 120 may or may not be set to enable it to receive fault trace initiation commands from the command control section 116. Then, in the case where it is enabled to receive fault trace initiation commands from the command control section 116, with the initial setting, the parameters for performing the collection of trace information can be set beforehand. In other words, an initial setting of the parameter for performing the collection of trace information can be made for collecting all of the contents of discarded frames only (Procedure 1). Also, an initial setting of the parameter for performing the collection of trace information can be made for collecting only the discard causes and the discard times for discarded frames (Procedure 2). Also, an initial setting can be made for switching the parameter for collecting trace information according to the use rate of CC (processor load) information obtained from the CC use rate monitoring section 129 (Procedure 3).

Conversely, in the case where it is enabled to received a fault trace initiation command from the command control section 116, the frame relay trace control section 120 can change the procedure according to whether the fault trace initiation command was issued from the maintenance console 3, or whether it was issued from the network monitoring apparatus 4 (Procedure 4 and Procedure 5).

In this way, with the present preferred embodiment can perform control according to the five types of procedures listed above. Below, the operations of each of these five types of procedures will be explained.

Procedure 1

Figure 7:
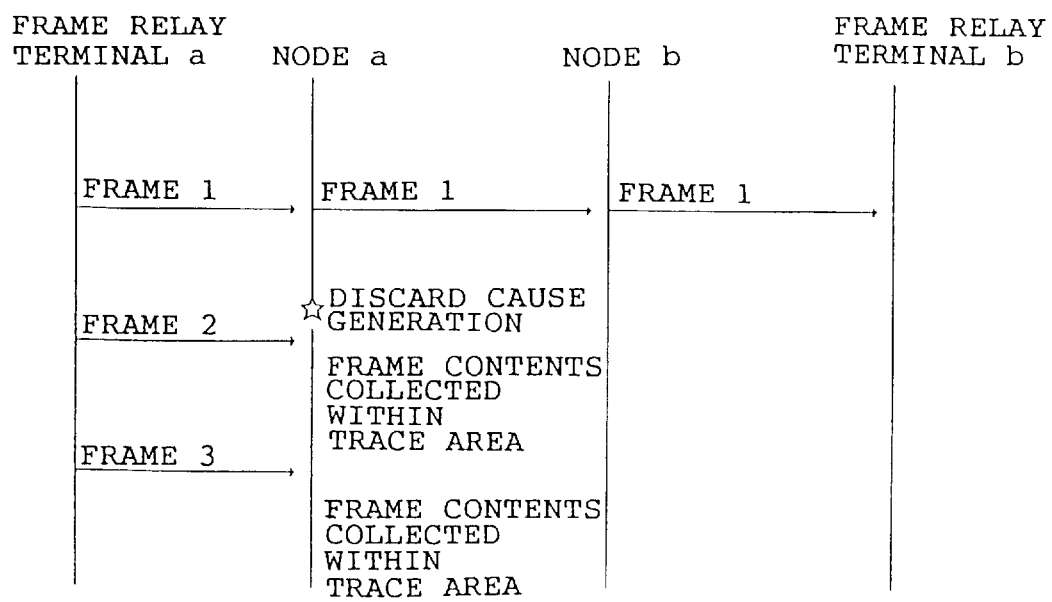
FIG. 7 is a time arrow chart explaining the first procedure of a fault trace within the frame relay network of a preferred embodiment of the present invention.

Procedure 1, as shown in FIG. 7, in the case where discarding has occurred within node 1, is a procedure for tracing only those frames that have been discarded. Moreover, as stated previously, this frame discarding may occur in the terminal frame reception processing section 121 or in the relay frame reception processing section 122. Moreover, FIG. 7 shows an example of a case where a discard cause has been generated within node 1a following the transfer of frame 1 from terminal 2a. Then, after the generation of the discard cause, the diagram shows the state where frame 2 and frame 3 sent from the same terminal 2a are each discarded.

Figure 8:
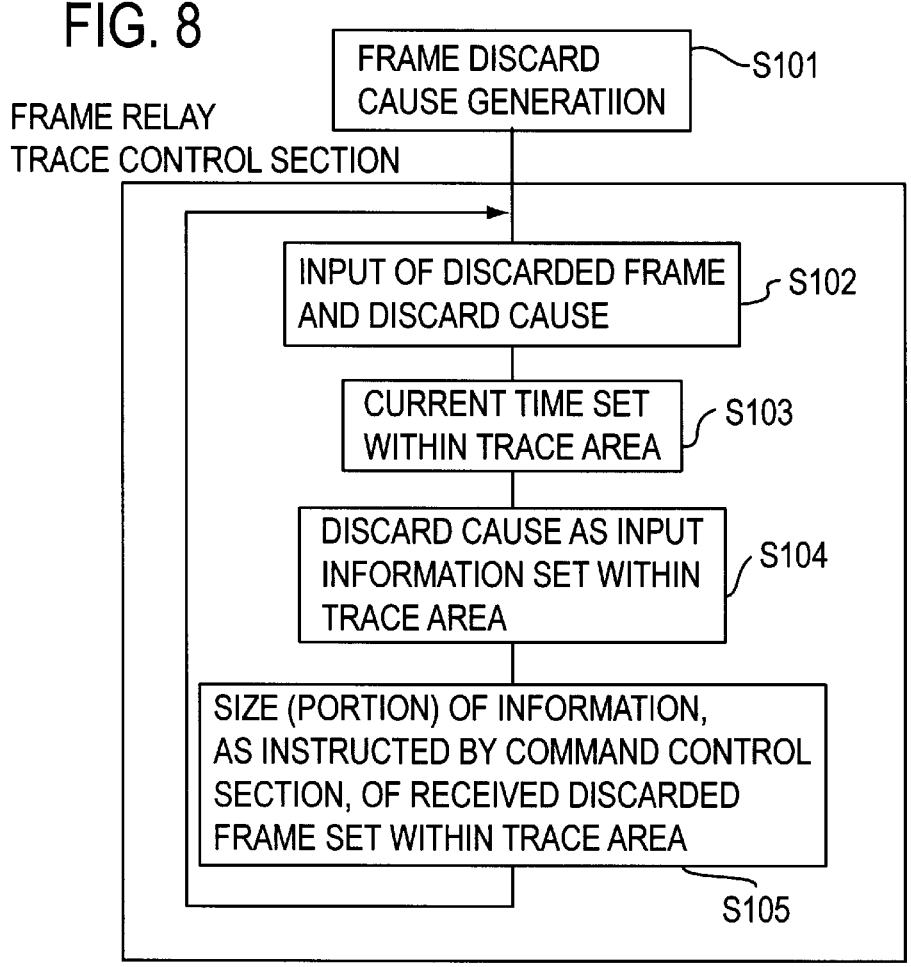
FIG. 8 is a flow chart performed within the first procedure of a fault trace within the frame relay network of a preferred embodiment of the present invention.

The contents of this Procedure 1 are as shown in the flow chart of FIG. 8. In other words, this flow starts when the frame discard cause is generated within step S101. Then, within step S102, the frame relay trace control section 120 inputs the discarded frame and the discard cause notified to it from either the terminal frame reception processing section 121 or from the relay frame reception processing section 122.

Next, within step S103, the frame relay trace control section 120 sets the current time within the trace area 13.

Next, within step S104, the frame relay trace control section 120 sets within the trace area 13 the discard cause that is the input information of step S102.

Next, within step S105, the frame relay trace control section 120, based on the discarded frame received within step S102, sets within the trace area 13 only the portion (size) of the contents of the discarded frame as instructed by the command control section 116.

Upon the completion of step S105, a return is made to step S102 for the processing of the next discarded frame that is to undergo processing.

Figure 9:
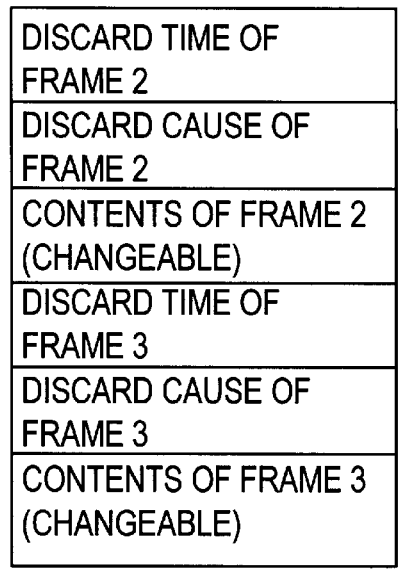
FIG. 9 is a diagram of the contents of the trace area resulting from the first procedure of a fault trace within the frame relay network of a preferred embodiment of the present invention.

When the above-described processing is performed, as shown in FIG. 7, as each frame is discarded, the collection of it within the trace area 13 is performed. Consequently, at the point where the processing of frame 3 has been completed, the contents written into the trace area 13 are as shown in FIG. 9. Moreover, the size (extent) of the discarded frame contents that are to be collected within the trace area 13 can be designated by a command from the command control section 116.

In this way, within Procedure 1, the frames to be traced can be limited to discarded frames only. Therefore, fault tracing can be executed without inducing congestion of the network.

Procedure 2

Figure 10:
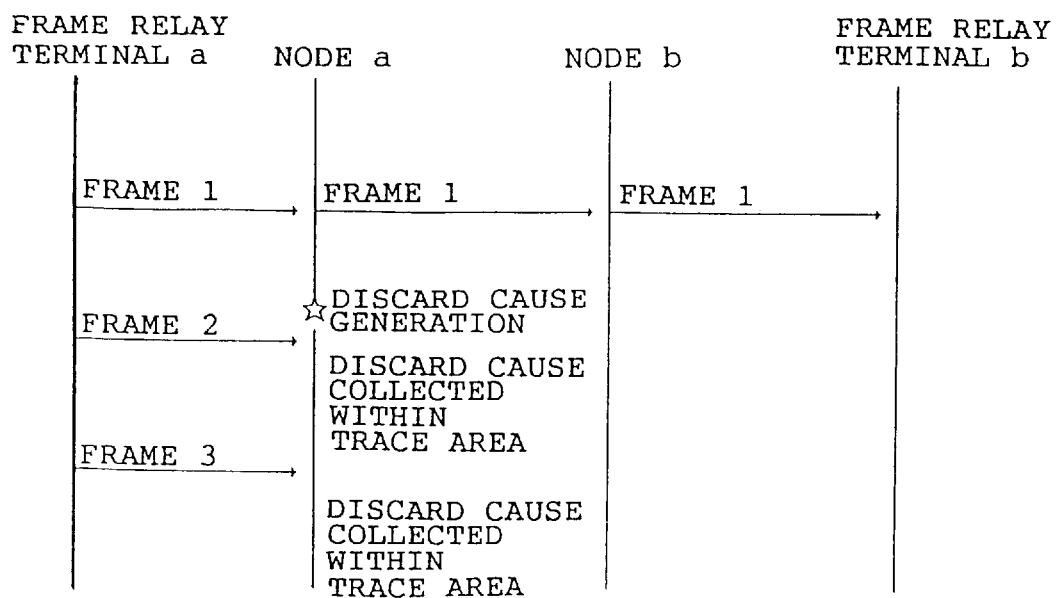
FIG. 10 is a time arrow chart explaining the second procedure of a fault trace within the frame relay network of a preferred embodiment of the present invention.

The above-described Procedure 1 is limited to traces of only discarded frames. However, in the case where the frame discard cause is congestion of the network, the copying process into the trace area can itself become a cause of further worsening of the congestion state of the network. Procedure 2, as shown in FIG. 10, further limits the objective of traces: it is a procedure for tracing only the discard causes and discard times for those frames that have been discarded. Moreover, FIG. 10, just like FIG. 7, shows an example of a case where a discard cause has been generated within node 1a following the transfer of frame 1 from terminal 2a. Then, after the generation of the discard cause, the diagram shows the state where frame 2 and frame 3 sent from the same terminal 2a are each discarded.

Figure 11:
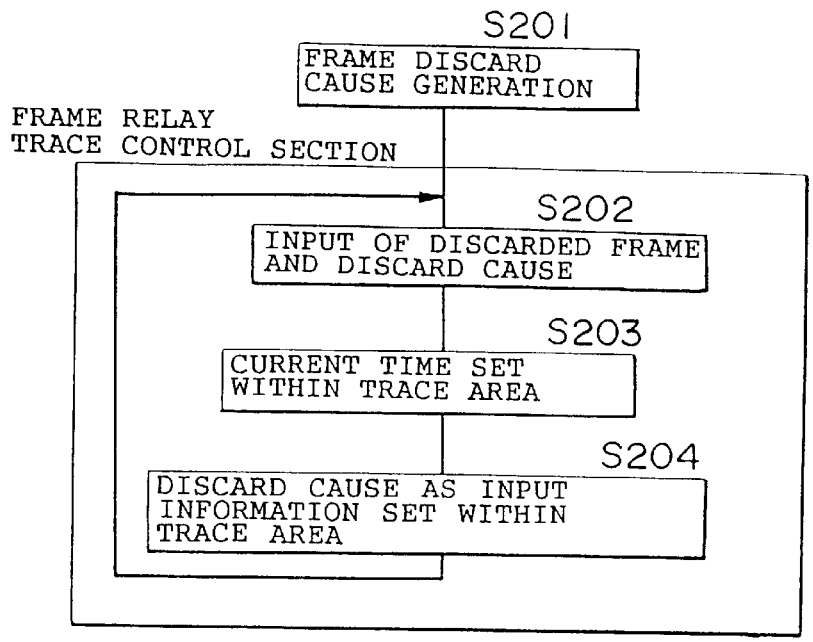
FIG. 11 is a flow chart performed within the second procedure of a fault trace within the frame relay network of a preferred embodiment of the present invention.

The contents of this Procedure 2 are as shown in the flow chart of FIG. 11. In other words, this flow starts when the frame discard cause is generated within step S201. Then, within step S202, the frame relay trace control section 120 inputs the discarded frame and the discard cause notified to it from either the terminal frame reception processing section 121 or from the relay frame reception processing section 122.

Next, within step S203, the frame relay trace control section 120 sets the current time within the trace area 13.

Next, within step S204, the frame relay trace control section 120 sets within the trace area 13 the discard cause that is the input information of step S202.

Upon the completion of step S204, a return is made to step S202 for the processing of the next discarded frame that is to undergo processing.

Figure 12:
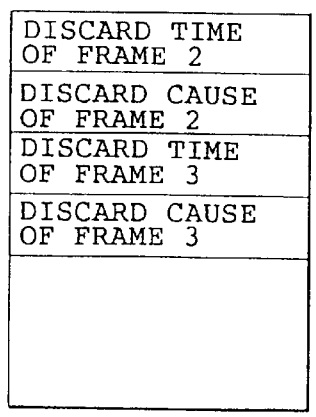
FIG. 12 is a diagram of the contents of the trace area resulting from the second procedure of a fault trace within the frame relay network of a preferred embodiment of the present invention.

When the above-described processing is performed, as shown in FIG. 10, as each frame is discarded, the collection of it within the trace area 13 is performed. Consequently, at the point where the processing of frame 3 has been completed, the contents written into the trace area 13 are as shown in FIG. 12.

In this way, within Procedure 2, the frames to be traced can be limited to discarded frames only; at the same time, the items of the trace can be limited to discard causes and discard times. Therefore, even if the network is in a state of congestion, fault traces can be executed without worsening the state of congestion. Moreover, even in the case where this Procedure 2 has been executed, the cause of the discard, and at what time it occurred, can be known from the trace results. Therefore, by analyzing these trace results, the faults can be divided apart.

Procedure 3

The above-described Procedure 2 enables the avoidance of a worsening of congestion; however, since the objectives of traces are only discard causes and discard times, there is a problem that it is difficult to perform a detailed division of faults. Therefore, if there is no problem regarding the worsening of congestion, it is desirable to also include the contents of discarded frames as a trace objective, as in Procedure 1. Also, if the number of frames flowing into the relevant node is not enough to fill the trace area 13, as with previously existing packet switching networks, by making all frames the objective of traces, a comparative examination with normal frames will also be enabled.

Figure 13:
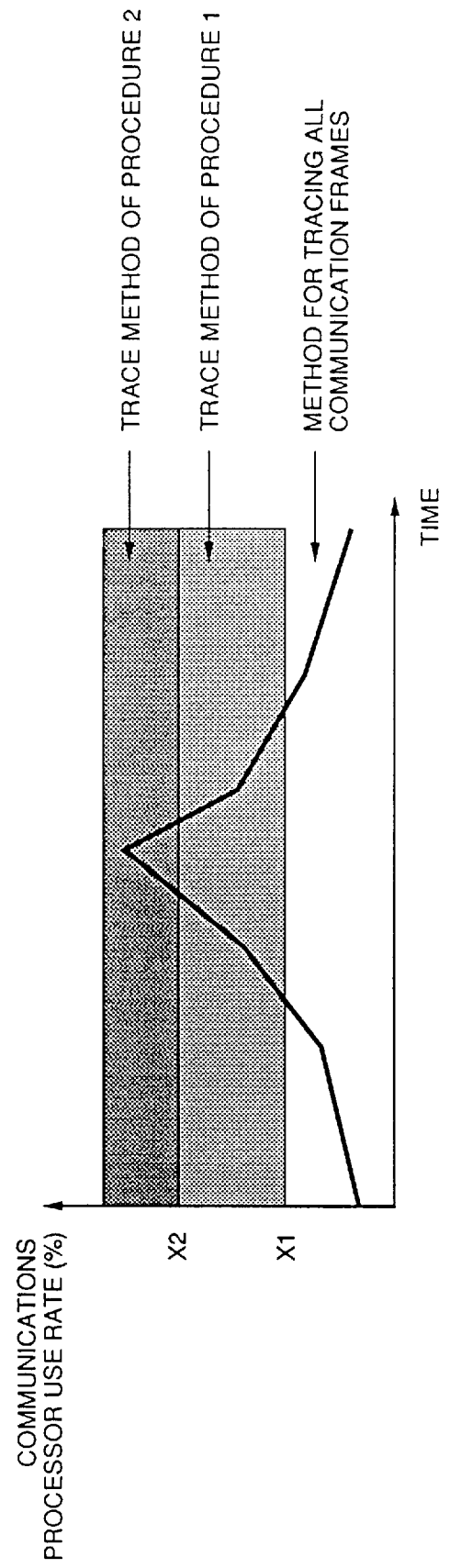
FIG. 13 is a diagram of the relationship between the use rate of a processor and the step of the switching trace method used within the third procedure of a fault trace within the frame relay network of a preferred embodiment of the present invention.

Thus, with Procedure 3, by using the use rate of CC (the load status of the communications processor) as notified by the CC use rate monitoring section 129 that is monitoring the state of congestion, as shown in FIG. 13, control in the form of being able to switch between trace objectives can be performed. In FIG. 13, it is shown that if the use rate of CC (the lode status of the communications processor) is in the 0–X1 [%] range, the contents of all frames, as well as the discard causes and discard times of discarded frames, will be traced; if it is in the X1–X2 [%] range, then only the contents, discard causes, and discard times of discarded frames will be traced; and if it is in the X2–100 [%] range, then only the discard causes and discard times of discarded frames will be traced.

Figure 14:
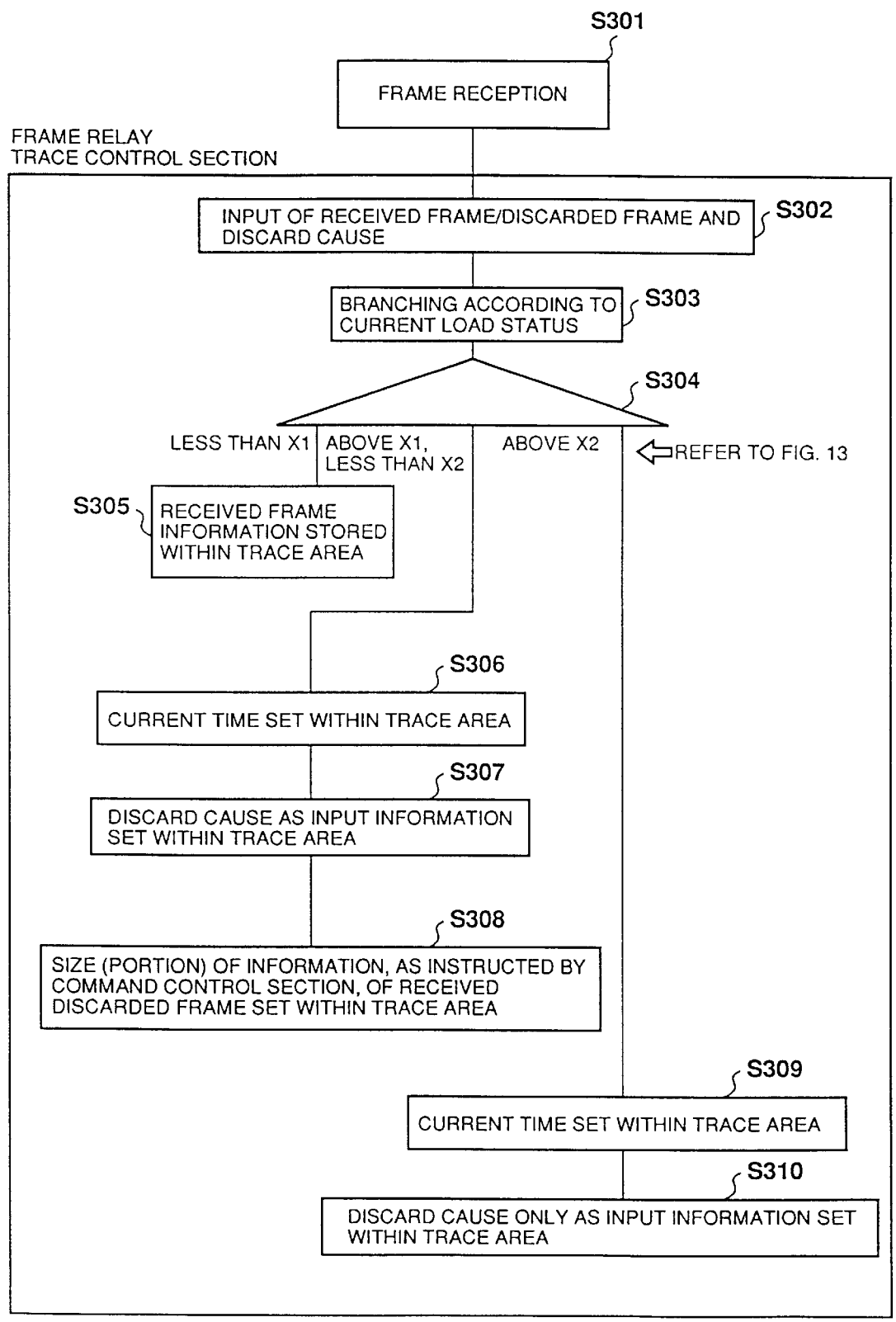
FIG. 14 is a flow chart executed within the third procedure of a fault trace within the frame relay network of a preferred embodiment of the present invention.

The contents of this Procedure 3 are as shown in the flow chart of FIG. 14. The flow chart of FIG. 14 is executed each time a frame is received within the terminal reception processing section 121 or the relay frame reception processing section 122.

In other words, when a frame is received in the first step S301, the frame relay trace control section 120, within step 302, inputs the received frame, or the discarded frame and the discard cause, from either the terminal frame reception processing section 121 or from the relay frame reception processing section 122.

Next, within steps S303 and S304, the frame relay trace control section 120, by relying on the extent of the current use rate of CC (the load status of the communications processor) as notified by the CC use rate monitoring section 129, causes processing to branch into one of the following routes. In other words, if the load status is below the first level X1 [%] shown in FIG. 13, then the processing of step S305 will be performed. Also, if this status is above X1 [%] and below the second level X2 [%], then it will perform the processing from step S306 on. Also, if it is above X2 [%], then it will perform the processing from step S309 on.

Within step S305, the frame relay trace control section 120 stores the information of received frames, without exception, within the trace area 13. When this step S305 is completed, processing is terminated.

Within step S306, the frame relay trace control section 120 sets the current time within the trace area 13. Next, within step S307, the frame relay trace control section 120 sets within the trace area 13 the discard cause that is the input information of step S302. Next, within step S308, the frame relay trace control section 120, based on the discarded frame received within step S302, sets within the trace area 13 only the portion (size) of the contents of the discarded frame as instructed by the command control section 116. Upon the completion of step S308, processing is terminated.

Within step S309, the frame relay trace control section 120 sets the current time within the trace area 13. Next, within step S310, the frame relay trace control section 120 sets within the trace area 13 the discard cause that is the input information of step S302. Upon the completion of step S310, processing is terminated.

Within the above-described steps S307, S308, or S310, in the case where the frame received by the frame relay trace control section 120 is not a discarded frame, no processing whatsoever is performed.

In this way, with Procedure 3, according to the rise and fall of the current use rate of CC, the parameter of the current traceable trace objective is calculated. Furthermore, the currently desirable most-detailed fault trace data can be obtained without worsening the congestion of the network.

Procedure 4

The above-described Procedure 3 is a procedure for automatically detecting the congestion status (use rate of CC) within node 1 and for changing the trace objective parameter. In contrast, this Procedure 4, through the operation of the maintenance console 3 connected to the node 1, enables the changing of trace objectives according to the intent of the operator.

In the case where this Procedure 4 is to be executed, within the first setting, the frame relay trace control section 120 is first set to a state where it can receive fault trace initiation commands from the command control section 116.

Figure 15:
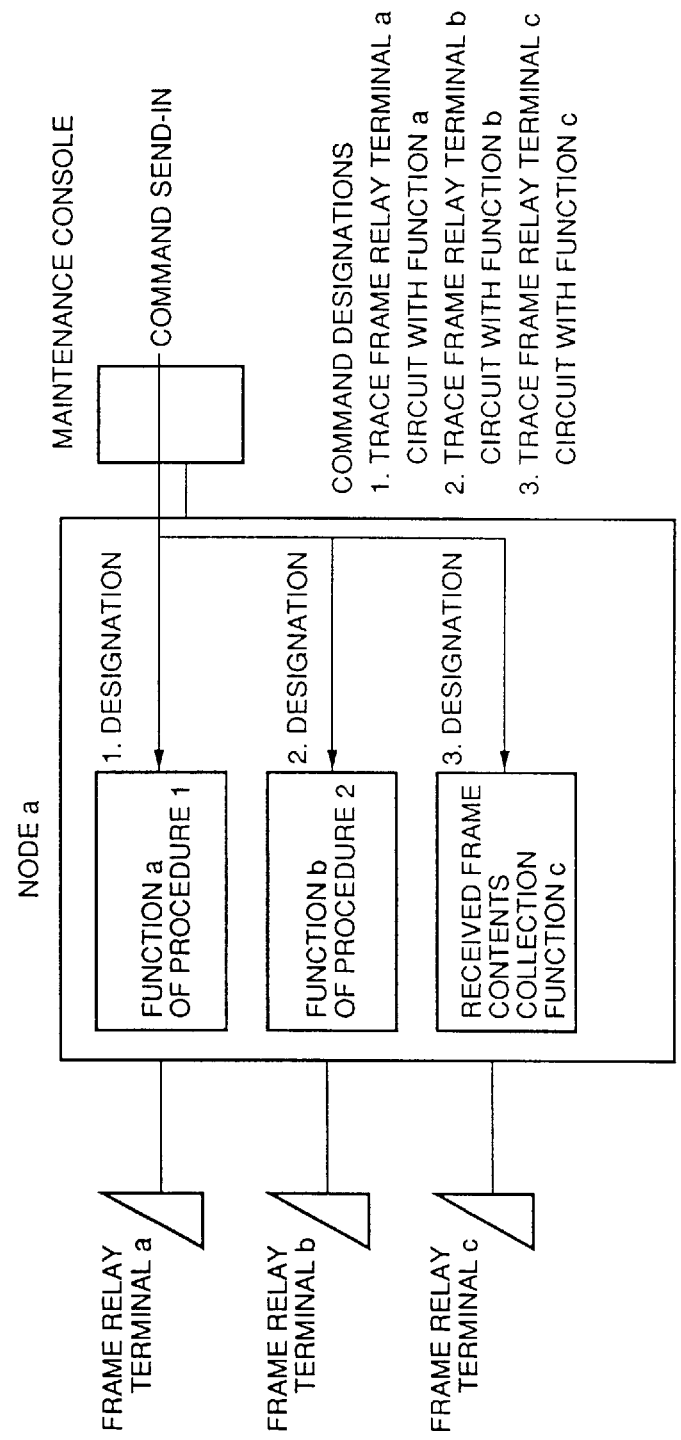
FIG. 15 is an explanatory diagram of the step of switching trace method used within the fourth procedure of a fault trace within the frame relay network of a preferred embodiment of the present invention.

Moreover, as shown in FIG. 15, because the issuing of the fault trace initiation command is performed by designating the circuit number of the terminals 2 that are to be the objective of the trace, only the frames to be communicated by the designated terminals 2 will be traced. In the example shown in FIG. 15, first, the circuit of terminal 2a is designated, and a fault trace initiation command is issued that has as its trace objective the contents, discard causes, and discard times of discarded frames; next, the circuit of terminal 2b is designated, and a fault trace initiation command is issued that has as its trace objective only the discard causes and discard times of discarded frames; finally, the circuit of terminal 2c is designated, and a fault trace initiation command is issued that has as its trace objective the contents of all frames, as well as the discard causes and discard times of discarded frames.

Figure 16:
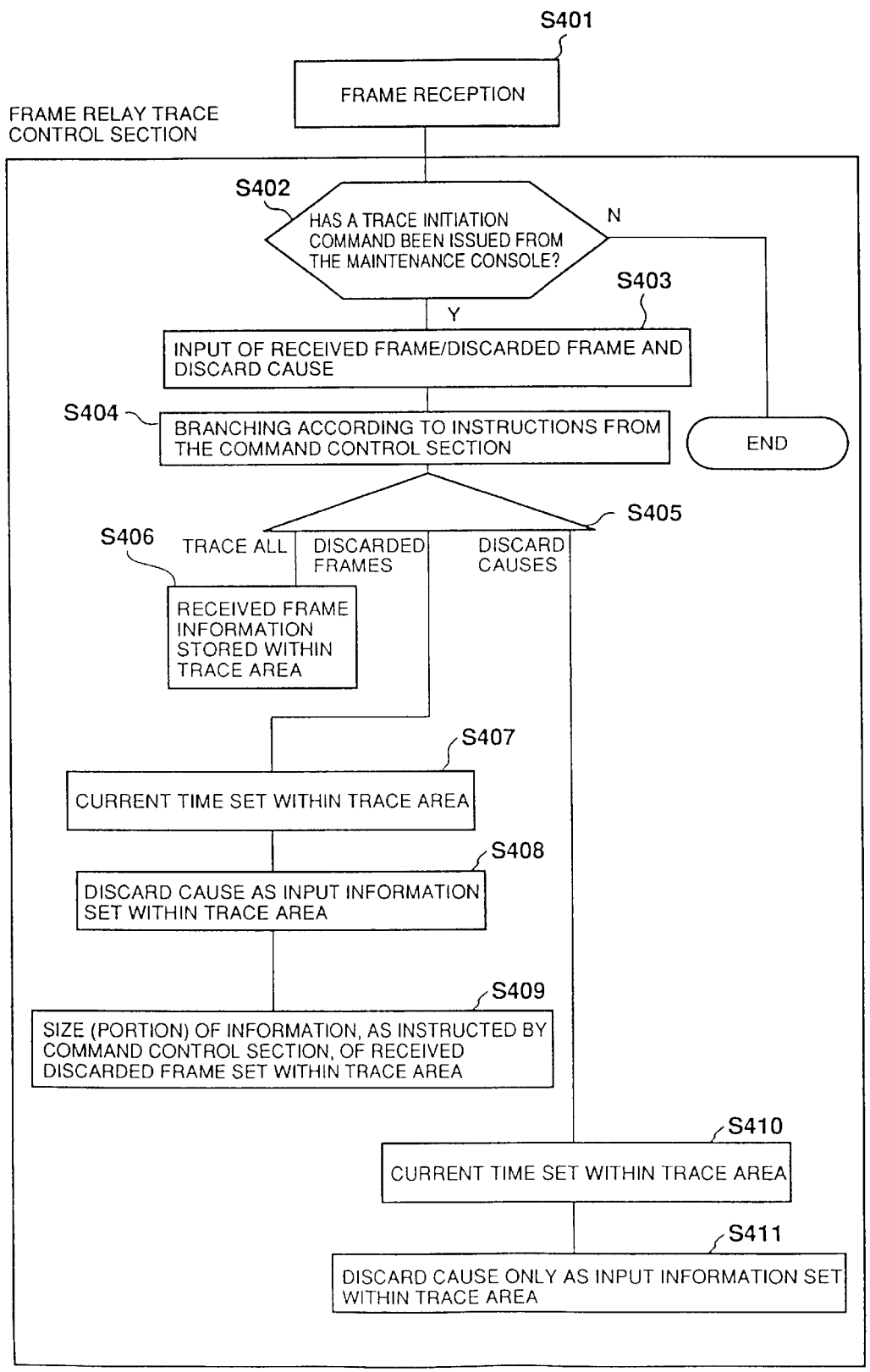
FIG. 16 is a flow chart executed within the fourth procedure of a fault trace within the frame relay network of a preferred embodiment of the present invention.

The contents of this Procedure 4 are as shown in the flow chart of FIG. 16. The flow chart of FIG. 16 is executed each time a frame is received within the terminal reception processing section 121 or the relay frame reception processing section 122.

In other words, when a frame is received in the first step S401, the frame relay trace control section 120, within step S402, judges whether or not the operator has inputted a fault trace initiation command by operating the maintenance console 3. Then, when a fault trace initiation command has not been inputted from the maintenance console 3, it then terminates processing as is.

In contrast, when a fault trace initiation command has been inputted from maintenance console 3, the frame relay trace control section 120, within step S403, inputs a received frame or a discarded frame and the discard cause from either the terminal frame reception processing section 121 or from the relay frame reception processing section 122.

Next, within steps S404 and S405, the frame relay trace control section 120, by relying on the trace objective designation included in the fault trace initiation command, performs one of the following different processing branches. In other words, if the contents of all frames as well as the discard causes and the discard times of discarded frames have been designated, then the processing of step S406 will be performed. Also, if only the contents, the discard causes, and the discard times of discarded frames have been designated, then it will perform the processing from step S407 on. Also, if only the discard causes and the discard times of discarded frames have been designated, then it will perform the processing from step S410 on.

Within step S406, the frame relay trace control section 120 stores the information of received frames, without exception, within the trace area 13. When this step S406 is completed, processing is terminated.

Within step S407, the frame relay trace control section 120 sets the current time within the trace area 13. Next, within step S408, the frame relay trace control section 120 sets within the trace area 13 the discard cause that is the input information of step S403. Next, within step S409, the frame relay trace control section 120, based on the discarded frame received within step S403, sets within the trace area 13 only the portion (size) of the contents of the discarded frame as instructed by the command control section 116. Upon the completion of step S409, processing is terminated.

Within step S410, the frame relay trace control section 120 sets the current time within the trace area 13. Next, within step S411, the frame relay trace control section 120 sets within the trace area 13 the discard cause that is the input information of step S403. Upon the completion of step S411, processing is terminated.

Within the above-described steps S408, S409, or S411, in the case where the frame received by the frame relay trace control section 120 is not a discarded frame, no processing whatsoever is performed.

In this way, with Procedure 4, according to the operations by the operator on the maintenance console 3, the parameter of the current traceable trace objective can be divided up.
Procedure 5

With the above-described Procedure 4, fault traces can be performed only within the node 1 that is connected to the maintenance console 3 which has performed a command entry. However, with long-distance communications, the case where frames are transferred over multiple nodes 1 is common. Therefore, even if a fault trace concerning a certain terminal 2 is performed within a certain node 1, if a fault trace is not performed within the node that is connected to the partner terminal 2 with which this certain terminal 2 is performing a communication, it cannot be said that this constitutes a complete fault trace of that communication.

This Procedure 5 is a procedure for using the network monitoring apparatus 4 that is connected to each of the nodes 1, for issuing a fault trace initiation command from this network monitoring apparatus 4 to both the sending and destination nodes 1a and 1b, and for performing fault traces within these sending and destination nodes 1a and 1b.

Figure 17:
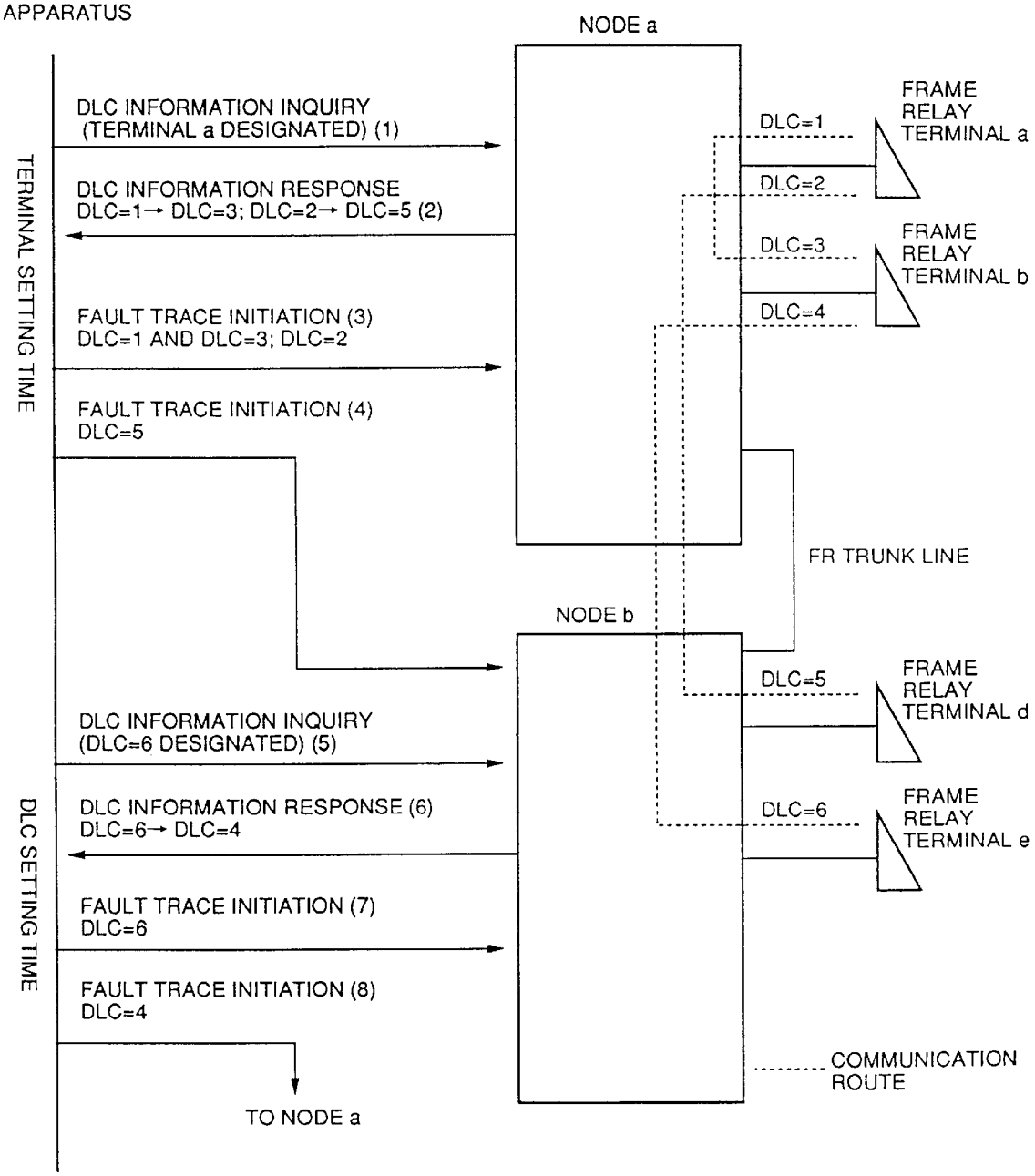
FIG. 17 is a time arrow chart explaining the fifth procedure of a fault trace within the frame relay network of a preferred embodiment of the present invention.

A summary of this Procedure 5 will be explained based on FIG. 17. Within this Procedure 5, when a fault trace initiation command is to be issued, it is possible to designate the terminal 2 that is to be the object of fault traces. Also, more specifically, if the DLC number of the communication (PVC) of the trace objective is known, it is also possible to designate this DLC number.

In the case where a terminal is designated, the network monitoring apparatus 4 first designates a terminal 2 for node 1, and makes an inquiry of the DLC information (1). When this inquiry is made, a response containing the DLC information comes from the node 1 (2). In the example shown in FIG. 17, since terminal 2a has been designated, the response shows the fact that the DLC numbers of the communication of which terminal 2a is the communication entity are DLC=1, DLC=2; the DLC number of the communication destination corresponding to DLC=1 is DLC=3; and the DLC number of the communication destination corresponding to DLC=2 is DLC=5.

When it has this response, the network monitoring apparatus 4 designates these DLC numbers to the nodes 1 that are connected to the terminals 2 that pertain to the DLC numbers of the response, and issues fault trace initiation commands (3, 4). In the example shown in FIG. 17, since DLC=1, DLC=3, and DLC=2 are DLC numbers pertaining to terminal 2a or to terminal 2b, both of which are connected to node 1a, the network monitoring apparatus 4 issues to the node 1a the fault trace initiation commands designated by DLC=1, DLC=3, and DLC=2, respectively (3). Simultaneously, since DLC=5 is the DLC number pertaining to the terminal 2c that is connected to the node 1b, the network monitoring apparatus 4 issues the fault trace initiation command designated by DLC=5 to the node 1b (4).

In the case where a DLC number is designated, the network monitoring apparatus 4 first designates the DLC number and makes an inquiry of the DLC information to the node 1 (5). When this inquiry is made, a response containing the DLC information comes from the node 1 (6). In the example shown in FIG. 17, since DLC=6 has been designated, the response shows the fact that the DLC number of the communication destination corresponding to DLC=6 is DLC=4.

When it has this response, the network monitoring apparatus 4 designates this DLC number to the nodes 1 that are connected to the terminals 2 that pertain to the DLC number of the response, and issues fault trace initiation commands (7,8). In the example shown in FIG. 17, since DLC=6 is the DLC number pertaining to the terminal 2e that is connected to the node 1b, the network monitoring apparatus 4 issues to the node 1b the fault trace initiation command designated by DLC=6. Simultaneously, since DLC=4 is the DLC number of the terminal 2b that is connected to the node 1a, the network monitoring apparatus 4 issues the fault trace initiation command designated by DLC=4 to the node 1a.

In the case where this Procedure 5 is to be executed, within the first setting, the frame relay trace control section 120 is first set to a state where it can receive fault trace initiation commands from the command control section 116.

Figure 18:
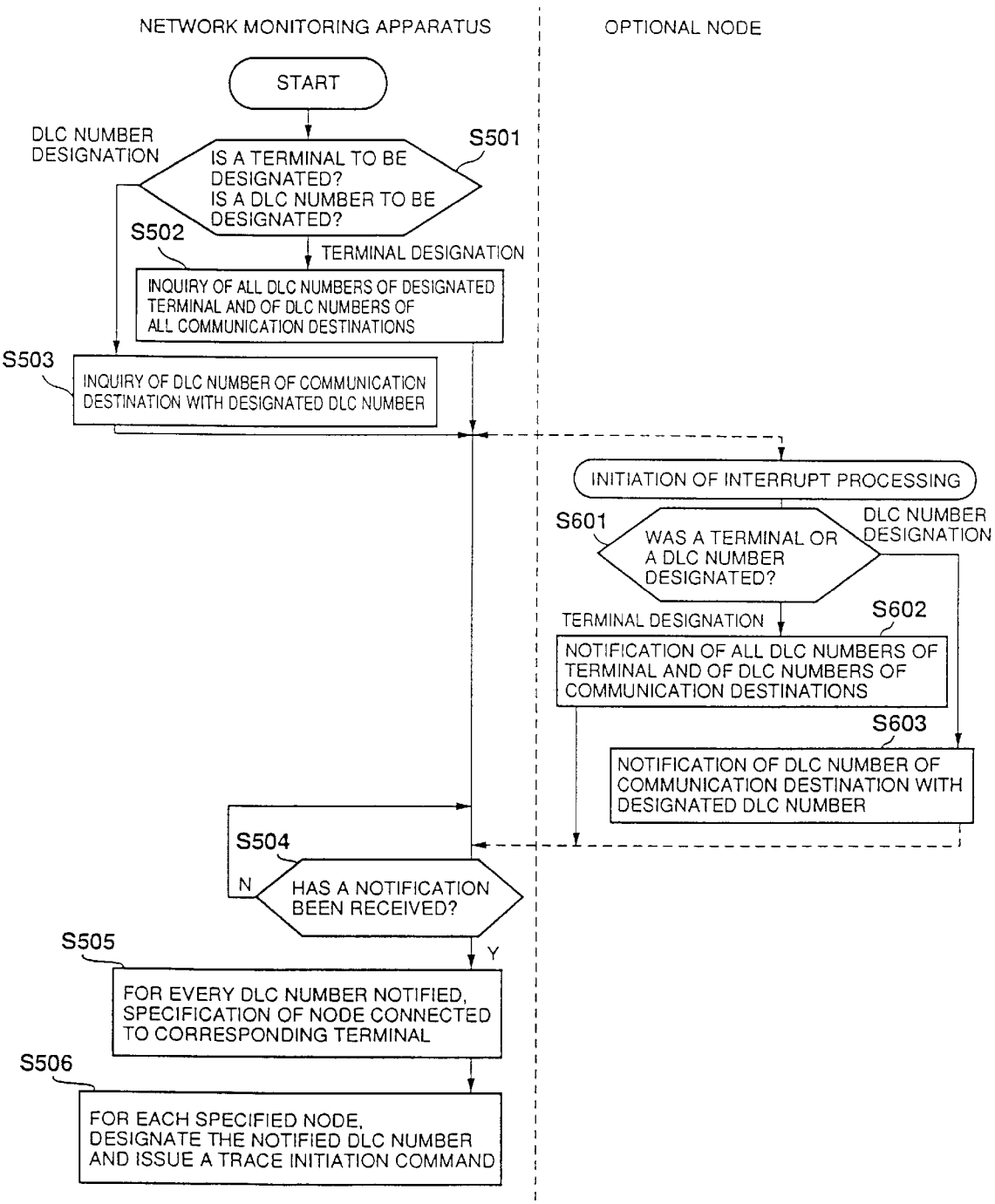
FIG. 18 is a flow chart executed within the fifth procedure of a fault trace within the frame relay network of a preferred embodiment of the present invention.
Figure 19:
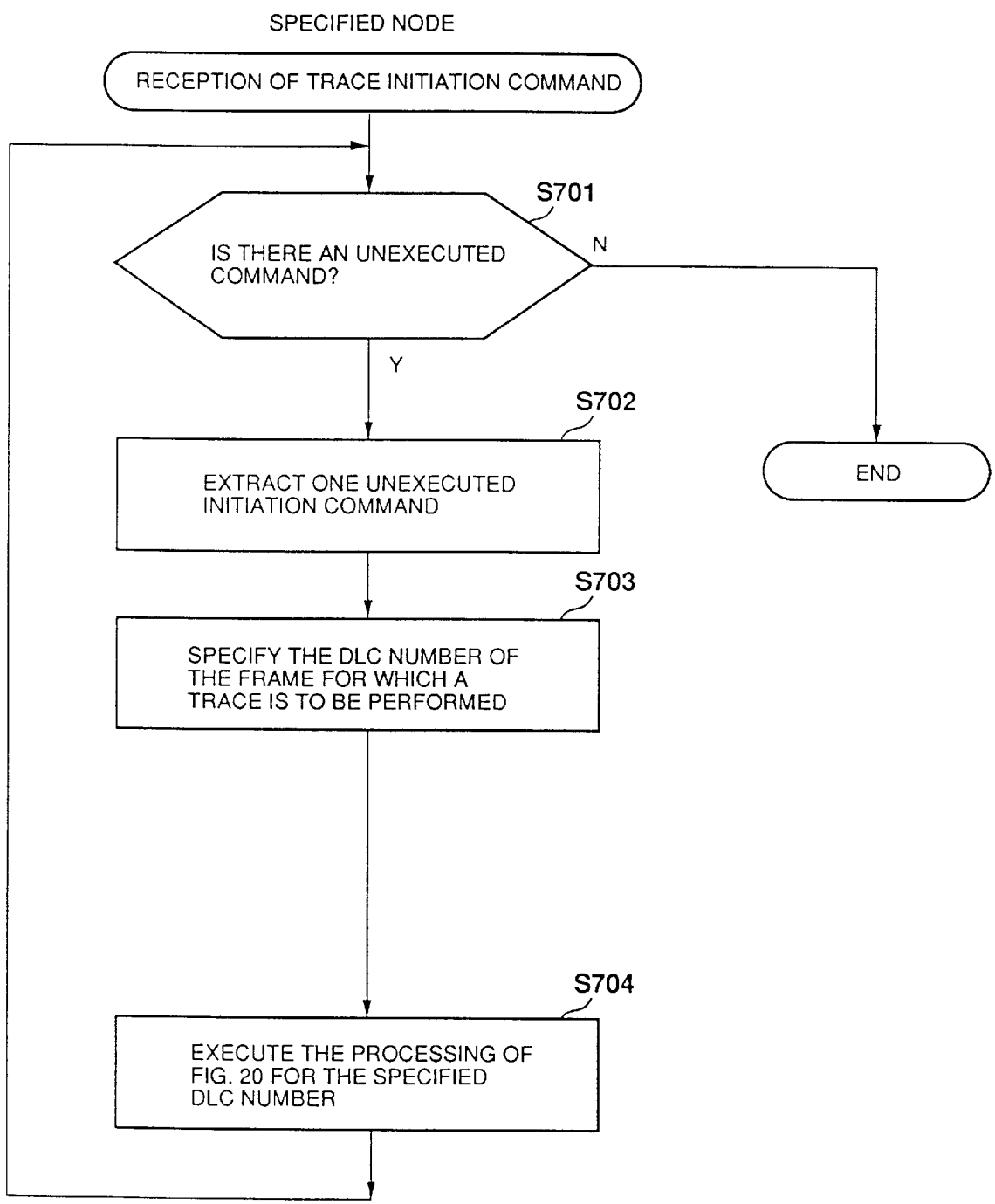
FIG. 19 is a flow chart executed within the fifth procedure of a fault trace within the frame relay network of a preferred embodiment of the present invention.
Figure 20:
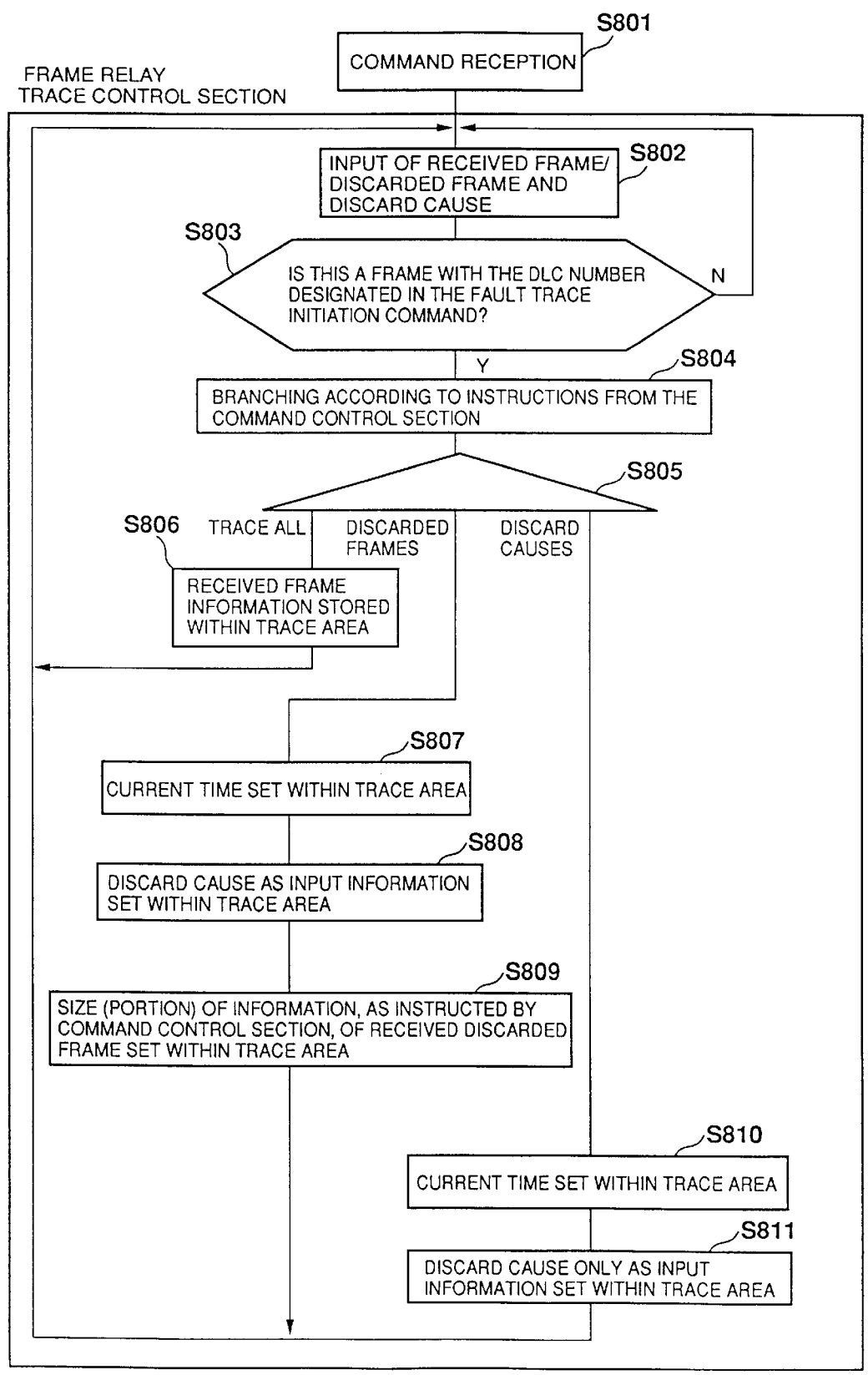
FIG. 20 is a flow chart executed within the fifth procedure of a fault trace within the frame relay network of a preferred embodiment of the present invention.

The contents of this Procedure 5 are as shown in the flow charts of FIG. 18 through FIG. 20. The flow chart of FIG. 18 is started by the operator operating the network monitoring apparatus 4 and by inputting a fault trace initiation command.

Then, within the first step S501, the network monitoring apparatus 4 checks whether a terminal or a DLC number has been designated with the fault trace initiation command. In the case where a terminal has been designated, within step S502, the network monitoring apparatus 4 makes an inquiry to the node 1 of all of the DLC numbers pertaining to the designated terminal 2, and of the DLC numbers of all of the communication destination terminals 2. In contrast, in the case where a DLC number has been designated, within step S503, the network monitoring apparatus 4 makes an inquiry to each of the nodes 1 of the DLC number for the communication destination terminal 2 corresponding to the designated DLC number. In either case, the network monitoring apparatus 4, within step S504, waits for a response notification from the node 1.

Upon reception of an inquiry from the network monitoring apparatus 4 (steps S502 and S503), each of the nodes 1 initiate interrupt processing. In other words, within step S601, the nodes 1 check whether a terminal or a DLC number has been designated within the inquiry. In the case where a terminal has been designated, within step S602, the nodes 1 notify the network monitoring apparatus 4 of all of the DLC numbers, as well as the DLC numbers of all of the communication destinations, that pertain to the designated terminal. In the case where a DLC number has been designated, within step S603, the nodes 1 notify the network monitoring apparatus 4 of the communication destination that corresponds to the designated DLC number.

Upon reception of the response notification from the node 1 (steps S602 and S603), the network monitoring apparatus 4 passes by step S504 and performs the processing of step S505. Within this step S505, for every DLC number that has been notified, the respective nodes connected to the terminals 2 that correspond to these DLC numbers are specified. Then, within the next step S506, for each specified node, the trace commands that designated the notified DLC numbers are issued for each node. Moreover, in the case where multiple DLC numbers have been notified, these trace initiation commands are issued for each of these DLC numbers.

The node 1 that has received a trace initiation command initiates the processing shown in FIG. 19. Within the processing shown in FIG. 19, within the first step S701, the node 1 checks whether or not there are any unexecuted fault trace commands. This, as with the node 1a of FIG. 17, is a check for those cases when multiple fault trace initiation commands have been designated for each separate DLC number. Then, if there are already no more unexecuted commands, processing is terminated as is.

In the case where there are unexecuted trace initiation commands, the node 1, within step S702, takes up one of the unexecuted trace initiation commands. Then, within the next step S703, it specifies the DLC number that was designated within the trace initiation command that was read out in step S702. Then, within the next step S704, it starts the processing shown in FIG. 20 of the DLC number specified within step S703. Moreover, since the processing shown in this FIG. 20 is processing that can be executed asynchronously with other processing, when the processing of FIG. 20 is started within step S704, the processing of FIG. 19 is returned to step S701.

Next will be explained the processing of FIG. 20 that is started in step S704. The processing of FIG. 20 is as follows: after the reception of the trace initiation command within step S801, within step 802, either a received frame or a discarded frame and the discard cause are inputted from the terminal frame reception processing section 121 or from the relay frame reception processing section 122.

Within the next step S803, a check is performed to ascertain whether or not the frame inputted in step 802 contains the DLC number designated in the fault trace initiation command. Furthermore, within step S803, every time the concerned node receives a fault trace initiation command from the network monitoring apparatus 4, the DLC number designated in the new command is added to the "designated DLC number" used in the above check.

In step S803, in the case where the inputted frame is judged to not contain the designated DLC number, processing is returned to step S802, and the input of the next frame is performed. Conversely, in the case where the inputted frame is judged to contain the designated DLC number, processing proceeds to step S804.

In steps S804 and S805, the frame relay trace control section 120, relying on the trace objective from the command control section 116, causes processing to branch into one of the following routes. In other words, if the contents of all frames as well as the discard causes and the discard times of discarded frames have been designated, then the processing of step S806 will be performed. Also, if only the contents, the discard causes, and the discard times of discarded frames have been designated, then it will perform the processing from step S807 on. Also, if only the discard causes and the discard times of discarded frames have been designated, then it will perform the processing from step S810 on.

Within step S806, the frame relay trace control section 120 stores the information of received frames, without exception, within the trace area 13. When this step S806 is completed, processing is returned to step S802, and the input of a new frame is performed.

Within step S807, the frame relay trace control section 120 sets the current time within the trace area 13. Next, within step S808, the frame relay trace control section 120 sets within the trace area 13 the discard cause that is the input information of step S802. Next, within step S809, the frame relay trace control section 120, based on the discarded frame received within step S802, sets within the trace area 13 only the portion (size) of the contents of the discarded frame as instructed by the command control section 116. Upon the completion of step S809, processing is returned to step S802, and the input of a new frame is performed.

Within step S810, the frame relay trace control section 120 sets the current time within the trace area 13. Next, within step S811, the frame relay trace control section 120 sets within the trace area 13 the discard cause that is the input information of step S802. Upon the completion of step S811, processing is returned to step S802, and the input of a new frame is performed.

Within the above-described steps S808, S809, or S811, in the case where the frame received by the frame relay trace control section 120 is not a discarded frame, no processing whatsoever is performed.

In this way, with Procedure 5, even in the case where a communication is passing through multiple nodes, through the multiple terminals that are performing the communication, frame relay traces can be easily performed.

An explanation of frame detection

Figure 21:
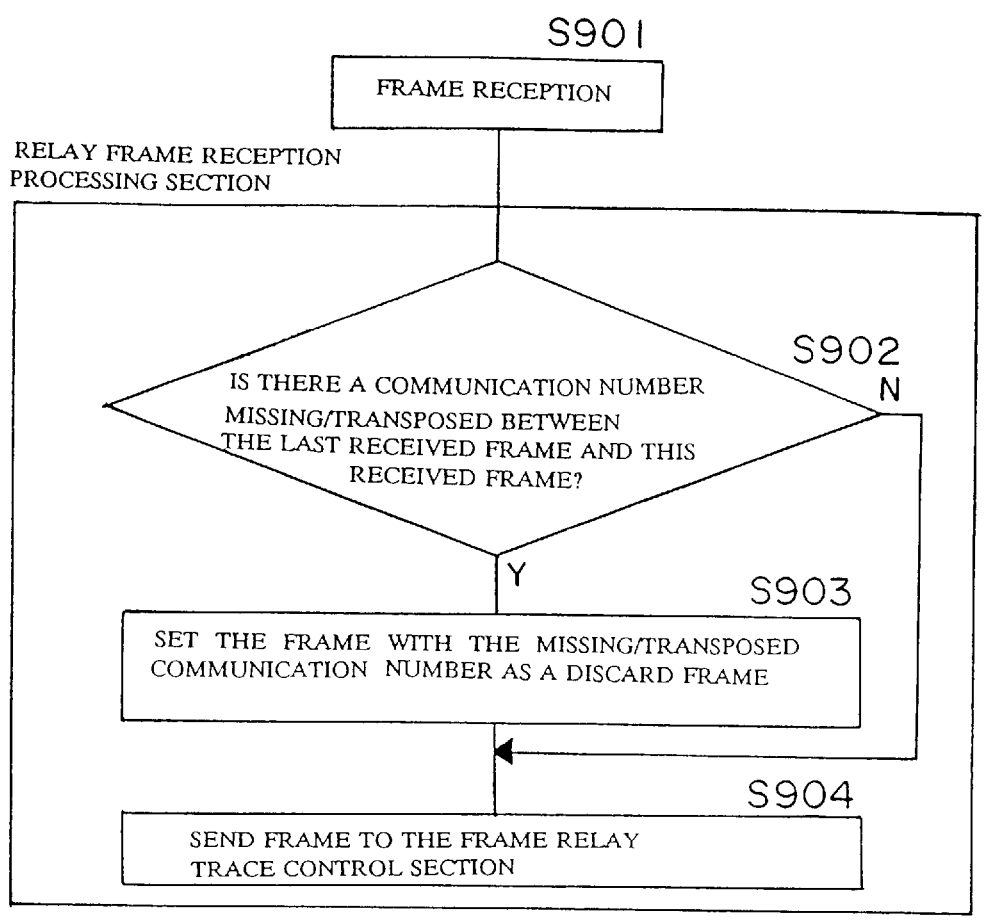
FIG. 21 is a flow chart showing the contents of communications number check processing executed within the intermediate frame reception procession section found within FIG. 2.

Here, within each procedure, the processing of frame loss detection that is being executed within the relay frame reception processing section 122 will be explained using FIG. 21. Within S901, the processing of FIG. 21 is started with the reception of a frame from another switching machine by the relay frame reception processing section 122.

Then, within step S902, the communication number of the received frame is read out. Then, the communication number of this received frame is compared with the communication number of a recently received frame that possesses the same DLC number as this frame.

In the case where the results of this comparison show that there is a missing number between both communication numbers, or that these two communication numbers have been transposed, within step S903, the frame with the missing or transposed communication number is set as a discarded frame. Moreover, at this time, in the case where a frame discard must be performed, the discarding of these frames is performed. In the case where it is judged as a result of the comparison of step S902 that there are no missing or transposed communication numbers, then step S903 is not performed.

In whichever case, within the next step S904, the frame received in step S901 and the frame that was set as a discarded frame in step S903 are sent to the frame relay trace control section 120.

Figure 22:
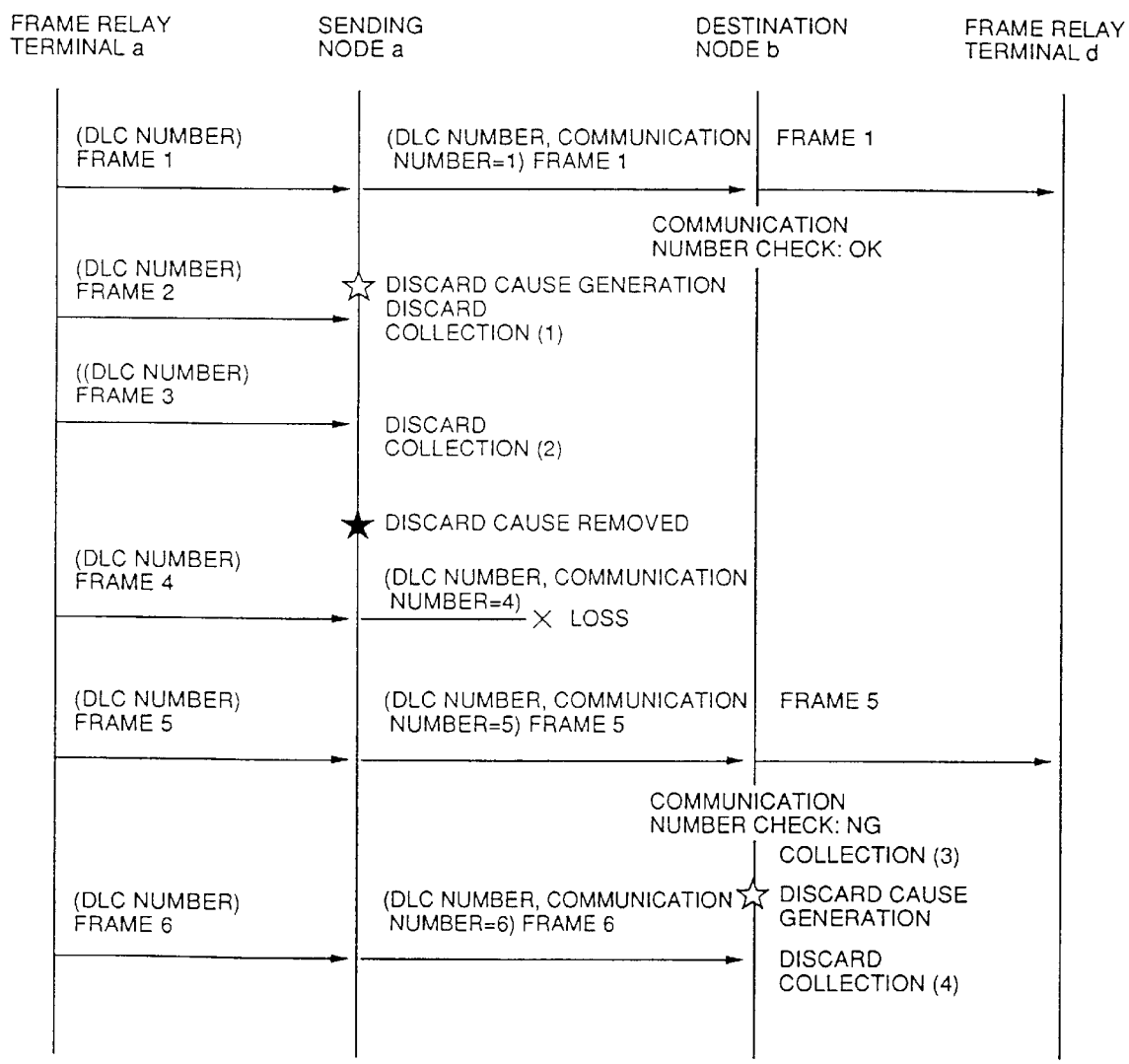
FIG. 22 is a time arrow chart explaining the fifth procedure with the processing of FIG. 21 added.

Next will be explained the flow of fault trace processing in the case where this type of a missing number has occurred. FIG. 22 shows an example where the processing of procedure 5 is executed on the PVC between the terminal 2*a* and the terminal 2*b* in the frame relay network shown in FIG. 3, and where the trace of only the discard causes and discard times of discarded frames has been designated by the command control section 116.

In the diagram, first, when frame 1 is received from terminal 2*a*, the sending node 1*a* attaches a communication number=1. The destination node 1*b* to which the frame 1 has been transferred, since frame 1 is the first frame number with this DLC number, gives an "OK" as the result of the communication number check, and sends the frame 1 to the terminal 1*b*.

After this, when a discard cause has occurred within the sending node 1*a*, the next frame 2 is discarded within the sending node 1*a*. In this case, this discard cause and discard time are collected within the trace area 13 (collection 1). In the same way, the next frame 3 is also discarded within the sending node 1*a*, and this discard cause and discard time are collected within the trace area 13 (collection 2).

After this, when this discard cause is removed, the next frame 4 has a communication number=4 attached to it by the sending node 1*a*, and it is transferred toward the destination node 1*b*. However, this frame 4, for some reason, is supposed to have become lost on the trunk line φ. In this case, the loss of this frame 4 is not recorded within the trace area 13 of the sending node 1*a*.

The next frame 5 has a communication number=5 attached to it by the sending node 1*a*, and it is transferred toward the destination node 1*b*. The destination node compares the communication number=5 of this frame 5 with the communication number=1 of the recently received frame 1. However, since the two communication numbers are not consecutive, the result of this communication number check is an "NG". In other words, it is judged that communication numbers 2, 3 and 4 have been lost. Therefore, the destination node 1*b* collects within the trace area the DLC numbers and the current times (discard times) of these frames, as well as the communication numbers 2, 3, and 4 (collection 3). Moreover, since frame 5 is normal, it is sent on as it to terminal 2*b*.

After this, when a discard cause is generated within the destination node 1*b*, the next frame 6 is transferred from the sending node 1*a*, but it is discarded at the destination node 1*b*. In this case, this discard cause and discard time is collected within the trace area 13 of the destination node 1*b* (collection 4).

FIG. 23 and FIG. 24 show the contents within each node 1*a* and 1*b*, respectively, following the performance of the processing of frame 6.

What we claim is:

1. A frame relay switching node forms a frame relay network for transmitting frames sent from one terminal to another terminal, said frame relay switching node comprising:

a frame reception section for receiving frames;

discarded frame detection means for detecting frames which have been discarded within said frame relay network;

collection means for collecting a portion of information concerning frames, including contents of frames which have been received by said frame reception section and discard-factors of discarded frames which have been detected by said discarded frames detection means;

storage means for storing information relating to frames which have been collected by the collection means, wherein a designation means for selectively performing, with respect to said collection means, designation for collecting contents of all frames which have been received by said frame reception section, designation for collecting from all frames that have been received by said frame reception section the contents of only discarded frames which have been detected by said discarded frame detection means, or designation for collecting only discard factors of discarded frames which have been detected by said discarded frames detection means.

2. The frame relay switching node of claim 1, further comprising a processor for performing frame transmission control, and wherein said designation means can switch contents of designation according to the rate of use of the processor.

3. The frame relay switching node of claim 2, wherein said designation means performs designation, in a case where the rate of use of said processor is less than a predetermined low first level, for collecting the contents of all frames which have been received by said frame reception section, designation, in a case where the rate of use of said processor is above said first level and less than a predetermined high second level, for collecting from all frames which have been received by said frame reception section the contents of only discarded frames which have been detected by said discarded frame detection means, or designation, in the case where the rate of use of said processor is above said second level, for collecting only the discard factors of discarded frames which have been detected by said discarded frame detection means.

* * * * *